(12) United States Patent
Loehr et al.

(10) Patent No.: US 9,288,770 B2
(45) Date of Patent: Mar. 15, 2016

(54) POWER HEADROOM REPORTING FOR IN-DEVICE COEXISTENCE INTERFERENCE AVOIDANCE

(71) Applicant: Panasonic Intellectual Property Corporation of America, Torrance, CA (US)

(72) Inventors: Joachim Loehr, Wiesbaden (DE); Martin Feuersaenger, Bremen (DE); Prateek Basu-Mallick, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/416,049

(22) PCT Filed: Aug. 2, 2013

(86) PCT No.: PCT/EP2013/066331
§ 371 (c)(1),
(2) Date: Jan. 20, 2015

(87) PCT Pub. No.: WO2014/020172
PCT Pub. Date: Feb. 6, 2014

(65) Prior Publication Data
US 2015/0195795 A1 Jul. 9, 2015

(30) Foreign Application Priority Data

Aug. 3, 2012 (EP) ..................................... 12005663

(51) Int. Cl.
*H04W 52/36* (2009.01)
*H04W 52/06* (2009.01)
(Continued)

(52) U.S. Cl.
CPC ............ *H04W 52/365* (2013.01); *H04W 52/06* (2013.01); *H04W 52/367* (2013.01); *H04W 52/146* (2013.01); *H04W 52/16* (2013.01)

(58) Field of Classification Search
CPC ........................... H04W 52/365; H04W 52/06
See application file for complete search history.

(56) References Cited

U.S. PATENT DOCUMENTS

2012/0069766 A1   3/2012   Fu et al.
2012/0176923 A1   7/2012   Hsu et al.
(Continued)

OTHER PUBLICATIONS

3GPP TS 36.101 V8.7.0, "3rd Generation Partnership Project; Technical Specification Group Radio Access Network; Evolved Universal Terrestrial Radio Access (E-UTRA); User Equipment (UE) radio transmission and reception (Release 8)," Sep. 2009, 156 pages.

(Continued)

*Primary Examiner* — Bobbak Safaipour
(74) *Attorney, Agent, or Firm* — Seed IP Law Group PLLC

(57) ABSTRACT

The invention relates methods for maximum output level reporting by a mobile terminal in a mobile communication system. The invention is also providing apparatus for performing these methods, and computer readable media the instructions of which cause the apparatus to perform the methods described herein. In order to allow for maximum output level reporting, a power management related power backoff value is first calculated for one radio technology by referring to a reception quality level set for communication via the other radio technology; thereafter a lower and upper bounds of a maximum output power level is calculated, then the maximum output power level ($P_{CMAX}$) for communication is set within the determined lower and upper bounds and finally the set maximum output power level is reported to a base station wherein the lower bound ($P_{CMAX\_L}$) may be calculated using MPR=0 dB, A-MPR=0 dB, and optionally $\Delta T_c$=0 dB.

19 Claims, 19 Drawing Sheets

(51) Int. Cl.
*H04W 52/14* (2009.01)
*H04W 52/16* (2009.01)

(56) References Cited

U.S. PATENT DOCUMENTS

| | | | |
|---|---|---|---|
| 2015/0003311 A1* | 1/2015 | Feuersaenger .... | H04W 52/0225 370/311 |
| 2015/0049705 A1* | 2/2015 | Feuersaenger .... | H04W 72/1215 370/329 |
| 2015/0117342 A1* | 4/2015 | Loehr ............... | H04W 72/1284 370/329 |
| 2015/0181604 A1* | 6/2015 | Feuersaenger .......... | H04L 5/001 370/329 |
| 2015/0189675 A1* | 7/2015 | Feuersaenger ...... | H04W 52/281 370/329 |
| 2015/0230286 A1* | 8/2015 | Feuersaenger .... | H04W 72/1215 370/252 |

OTHER PUBLICATIONS

3GPP TS 36.133 V8.7.0, "3rd Generation Partnership Project; Technical Specification Group Radio Access Network; Evolved Universal Terrestrial Radio Access (E-UTRA); Requirements for support for radio resource management (Release 8)," Sep. 2009, 317 pages.

3GPP TS 36.213 V8.8.0, "3rd Generation Partnership Project; Technical Specification Group Radio Access Network; Evolved Universal Terrestrial Radio Access (E-UTRA); Physical layer procedures (Release 8)," Sep. 2009, 77 pages.

3GPP TS 36.211 V8.9.0, 3rd Generation Partnership Project; Technical Specification Group Radio Access Network; Evolved Universal Terrestrial Radio Access (E-UTRA); Physical Channels and Modulation (Release 8), Dec. 2009, 83 pages.

3GPP TS 36.321 V10.0.0, "3rd Generation Partnership Project; Technical Specification Group Radio Access Network; Evolved Universal Terrestrial Radio Access (E-UTRA); Medium Access Control (MAC) protocol specification (Release 10)," Dec. 2010, 53 pages.

Chairman: "Chairman Notes", 3GPP Draft; RAN2-78 Chairman Notes May 25, 2012 1700, 3rd Generation Partnership Project (3GPP), Mobile Competence Centre; 650, Route Des Lucioles; F-06921 Sophia-Antipolis Cedex; France, vol. RAN WG2, no. Prague, Czech Republic; May 21, 2012-May 25, 2012, May 26, 2012, XP050607769, [retrieved on May 26, 2012]*the whole document*.

Baghel et al., "Coexistence Possibilities of LTE with ISM Technologies and GNSS" IEEE National Conference on Communications (NCC), Jan. 28-30, 2011, 5 pages.

Extended European Search Report Dated Dec. 12, 2013, for corresponds EP Application No. 12005663.5—2411, 10 pages.

International Search Report dated Oct. 30, 2013, for corresponding International Application No. PCT/EP2013/066331, 3 pages.

* cited by examiner

| $C_7$ | $C_6$ | $C_5$ | $C_4$ | $C_3$ | $C_2$ | $C_1$ | R |

Oct1

| $C_7$ | $C_6$ | $C_5$ | $C_4$ | $C_3$ | $C_2$ | $C_1$ | R |
|---|---|---|---|---|---|---|---|
| R | V | PH (Type 2, PCell) ||||||
| R | R | $P_{CMAX,c}$ 1 ||||||
| R | V | PH (Type 1, PCell) ||||||
| R | R | $P_{CMAX,c}$ 2 ||||||
| R | V | PH (Type 1, Scell 1) ||||||
| R | R | $P_{CMAX,c}$ 3 ||||||

...

| R | V | PH (Type 1, Scell n) |
|---|---|---|
| R | R | $P_{CMAX,c}$ m |

POWER HEADROOM REPORTING FOR IN-DEVICE COEXISTENCE INTERFERENCE AVOIDANCE

FIELD OF THE INVENTION

The invention relates methods for maximum output power level reporting by a mobile terminal in a mobile communication system. The invention is also providing apparatus for performing the methods described herein, as well as computer readable media the instructions of which cause the apparatus and system to perform the methods described herein.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

E-UTRAN Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE (Release 8) is subdivided in the time-frequency domain in so-called sub-frames. In 3GPP LTE (Release 8) each sub-frame is divided into two downlink slots as shown in FIG. 3, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each of OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference).

The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Uplink Access Scheme for LTE

For Uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size BWgrant during one time interval, e.g. a sub-frame of 0.5 ms, onto which coded information bits are mapped. It should be noted that a sub-frame, also referred to as transmission time interval (TTI), is the smallest time interval for user data transmission. It is however possible to assign a frequency resource BWgrant over a longer time period than one TTI to a user by concatenation of sub-frames.

UL Scheduling Scheme for LTE

The uplink scheme allows for both scheduled access, i.e. controlled by eNB, and contention-based access.

In case of scheduled access the UE is allocated a certain frequency resource for a certain time (i.e. a time/frequency resource) for uplink data transmission. However, some time/frequency resources can be allocated for contention-based access. Within these time/frequency resources, UEs can transmit without first being scheduled. One scenario where UE is making a contention-based access is for example the random access, i.e. when UE is performing initial access to a cell or for requesting uplink resources.

For the scheduled access Node B scheduler assigns a user a unique frequency/time resource for uplink data transmission. More specifically the scheduler determines
 which UE(s) that is (are) allowed to transmit,
 which physical channel resources (frequency),
 Transport format (Modulation Coding Scheme (MCS)) to be used by the mobile terminal for transmission The allocation information is signalled to the UE via a scheduling grant, sent on the L1/L2 control channel. For simplicity reasons this channel is called uplink grant channel in the following. A scheduling grant message contains at least information which part of the frequency band the UE is allowed to use, the validity period of the grant, and the transport format the UE has to use for the upcoming uplink transmission. The shortest validity period is one sub-frame. Additional information may also be included in the grant message, depending on the selected scheme. Only "per UE" grants are used to grant the right to transmit on the UL-SCH (i.e. there are no "per UE per RB" grants). Therefore the UE needs to distribute the allocated resources among the radio bearers according to some rules, which will be explained in detail in the next section. Unlike in HSUPA there is no UE based transport format selection. The eNB decides the transport format based on some information, e.g. reported scheduling information and QoS info, and UE has to follow the selected transport format. In HSUPA Node B assigns the maximum uplink resource and UE selects accordingly the actual transport format for the data transmissions.

Since the scheduling of radio resources is the most important function in a shared channel access network for determining Quality of service, there are a number of requirements that should be fulfilled by the UL scheduling scheme for LTE in order to allow for an efficient QoS management.
 Starvation of low priority services should be avoided
 Clear QoS differentiation for radio bearers/services should be supported by the scheduling scheme
 The UL reporting should allow fine granular buffer reports (e.g. per radio bearer or per radio bearer group) in order to allow the eNB scheduler to identify for which Radio Bearer/service data is to be sent.
 It should be possible to make clear QoS differentiation between services of different users
 It should be possible to provide a minimum bit rate per radio bearer As can be seen from above list one essential aspect of the LTE scheduling scheme is to provide mechanisms with which the operator can control the partitioning of its aggregated cell capacity between the radio bearers of the different QoS classes. The QoS class of a radio bearer is identified by the QoS profile of the corresponding SAE bearer signalled from AGW to eNB as described before. An operator can then allocate a certain amount of its aggregated cell capacity to the aggregated traffic associated with radio bearers of a certain QoS class. The main goal of employing this class-based approach is to be able to differentiate the treatment of packets depending on the QoS class they belong to.

Layer 1/Layer 2 (L1/L2) Control Signaling

In order to inform the scheduled users about their allocation status, transport format and other data-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length is a multiple of the sub-frames. The TTI length may be fixed in a service area for all users, may be different for different users, or may even by dynamic for each user. Generally, the L1/2 control signaling needs only be transmitted once per TTI.

The L1/L2 control signaling is transmitted on the Physical Downlink Control Channel (PDCCH). A PDCCH carries a message as a Downlink Control Information (DCI), which includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories, Shared Control Information (SCI) carrying Cat 1 information and Downlink Control Information (DCI) carrying Cat 2/3 information.

Shared Control Information (SCI) Carrying Cat 1 Information

The shared control information part of the L1/L2 control signaling contains information related to the resource allocation (indication). The shared control information typically contains the following information:

- A user identity indicating the user(s) that is/are allocated the resources.
- RB allocation information for indicating the resources (Resource Blocks (RBs)) on which a user(s) is/are allocated. The number of allocated resource blocks can be dynamic.
- The duration of assignment (optional), if an assignment over multiple sub-frames (or TTIs) is possible.

Depending on the setup of other channels and the setup of the Downlink Control Information (DCI)—see below—the shared control information may additionally contain information such as ACK/NACK for uplink transmission, uplink scheduling information, information on the DCI (resource, MCS, etc.).

Dedicated Control Information (DCI) Carrying Cat 2/3 Information

The dedicated control information part of the L1/L2 control signaling contains information related to the transmission format (Cat 2 information) of the data transmitted to a scheduled user indicated by the Cat 1 information. Moreover, in case of using (Hybrid) ARQ as a retransmission protocol, the Cat 2 information carries HARQ (Cat 3) information. The dedicated control information needs only to be decoded by the user scheduled according to Cat 1. The dedicated control information typically contains information on:

- Cat 2 information: Modulation scheme, transport-block (payload) size or coding rate, MIMO (Multiple Input Multiple Output)-related information, etc. Either the transport-block (or payload size) or the code rate can be signaled. In any case these parameters can be calculated from each other by using the modulation scheme information and the resource information (number of allocated resource blocks)
- Cat 3 information: HARQ related information, e.g. hybrid ARQ process number, redundancy version, retransmission sequence number Downlink Data Transmission Regarding downlink data transmission, L1/L2 control signaling is transmitted on a separate physical channel (PDCCH), along with the downlink packet data transmission. This L1/L2 control signaling typically contains information on:

- The physical resource(s) on which the data is transmitted (e.g. subcarriers or subcarrier blocks in case of OFDM, codes in case of CDMA). This information allows the mobile terminal (receiver) to identify the resources on which the data is transmitted.
- The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.

Hybrid ARQ (HARQ) information:
- HARQ process number: Allows the user equipment to identify the hybrid ARQ process on which the data is mapped.
- Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.
- Redundancy and/or constellation version: Tells the user equipment, which hybrid ARQ redundancy version is used (required for de-rate-matching) and/or which modulation constellation version is used (required for demodulation).

UE Identity (UE ID): Tells for which user equipment the L1/L2 control signaling is intended for. In typical implementations this information is used to mask the CRC of the L1/L2 control signaling in order to prevent other user equipments to read this information.

Uplink Data Transmission

To enable an uplink packet data transmission, L1/L2 control signaling is transmitted on the downlink (PDCCH) to tell the user equipment about the transmission details. This L1/L2 control signaling typically contains information on:

- The physical resource(s) on which the user equipment should transmit the data (e.g. subcarriers or subcarrier blocks in case of OFDM, codes in case of CDMA).
- The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:
- HARQ Process number: Tells the user equipment from which hybrid ARQ process it should pick the data.
- Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.
- Redundancy and/or constellation version: Tells the user equipment, which hybrid ARQ redundancy version to use (required for rate-matching) and/or which modulation constellation version to use (required for modulation).

UE Identity (UE ID): Tells which user equipment should transmit data. In typical implementations this information is used to mask the CRC of the L1/L2 control signaling in order to prevent other user equipments to read this information.

There are several different possibilities how to exactly transmit the information pieces mentioned above in uplink and downlink data transmission. Moreover, in uplink and downlink, the L1/L2 control information may also contain additional information or may omit some of the information. For example:

HARQ process number may not be needed, i.e. is not signaled, in case of a synchronous HARQ protocol.

A redundancy and/or constellation version may not be needed, and thus not signaled, if Chase Combining is used (always the same redundancy and/or constellation version) or if the sequence of redundancy and/or constellation versions is pre-defined.

Power control information may be additionally included in the control signaling.

MIMO related control information, such as e.g. pre-coding, may be additionally included in the control signaling.

In case of multi-codeword MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore, it should be noted that the redundancy version (RV) information is jointly encoded with the transport format information, i.e. the RV info is embedded in the transport format (TF) field. The Transport Format (TF) respectively modulation and coding scheme (MCS) field has for example a size of 5 bits, which corresponds to 32 entries. 3 TF/MCS table entries are reserved for indicating redundancy versions (RVs) 1, 2 or 3. The remaining MCS table entries are used to signal the MCS level (TBS) implicitly indicating RV0. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

DRX (Discontinuous Reception)

DRX functionality can be configured for RRC_IDLE, in which case the UE uses either the specific or default DRX value (defaultPagingCycle); the default is broadcasted in the System Information, and can have values of 32, 64, 128 and 256 radio frames. If both specific and default values are available, the shorter value of the two is chosen by the UE. The UE needs to wake up for one paging occasion per DRX cycle, the paging occasion being one subframe.

DRX functionality can be also configured for an "RRC_CONNECTED" UE, so that it does not always need to monitor the downlink channels. In order to provide reasonable battery consumption of user equipment, 3GPP LTE (Release 8/9) as well as 3GPP LTE-A (Release 10) provides a concept of discontinuous reception (DRX). Technical Standard TS 36.321 Chapter 5.7 explains the DRX and is incorporated by reference herein.

The following parameters are available to define the DRX UE behavior; i.e. the On-Duration periods at which the mobile node is active, and the periods where the mobile node is in a DRX mode.

On duration: duration in downlink sub-frames that the user equipment, after waking up from DRX, receives and monitors the PDCCH. If the user equipment successfully decodes a PDCCH, the user equipment stays awake and starts the inactivity timer; [1-200 subframes; 16 steps: 1-6, 10-60, 80, 100, 200]

DRX inactivity timer: duration in downlink sub-frames that the user equipment waits to successfully decode a PDCCH, from the last successful decoding of a PDCCH; when the UE fails to decode a PDCCH during this period, it re-enters DRX. The user equipment shall restart the inactivity timer following a single successful decoding of a PDCCH for a first transmission only (i.e. not for retransmissions). [1-2560 subframes; 22 steps, 10 spares: 1-6, 8, 10-60, 80, 100-300, 500, 750, 1280, 1920, 2560]

DRX Retransmission timer: specifies the number of consecutive PDCCH subframes where a downlink retransmission is expected by the UE after the first available retransmission time. [1-33 subframes, 8 steps: 1, 2, 4, 6, 8, 16, 24, 33]

DRX short cycle: specifies the periodic repetition of the on duration followed by a possible period of inactivity for the short DRX cycle. This parameter is optional. [2-640 subframes; 16 steps: 2, 5, 8, 10, 16, 20, 32, 40, 64, 80, 128, 160, 256, 320, 512, 640]

DRX short cycle timer: specifies the number of consecutive subframes the UE follows the short DRX cycle after the DRX Inactivity Timer has expired. This parameter is optional.[1-16 subframes]

Lonq DRX Cycle Start offset: specifies the periodic repetition of the on duration followed by a possible period of inactivity for the DRX long cycle as well as an offset in subframes when on-duration starts (determined by formula defined in TS 36.321 section 5.7); [cycle length 10-2560 subframes; 16 steps: 10, 20, 30, 32, 40, 64, 80, 128, 160, 256, 320, 512, 640, 1024, 1280, 2048, 2560; offset is an integer between [0-subframe length of chosen cycle]]

The total duration that the UE is awake is called "Active time". The Active Time includes the on-duration of the DRX cycle, the time UE is performing continuous reception while the inactivity timer has not expired and the time UE is performing continuous reception while waiting for a downlink retransmission after one HRQ RTT. Similarly, for the uplink the UE is awake at the subframes where uplink retransmission grants can be received, i.e. every 8 ms after initial uplink transmission until maximum number of retransmissions is reached. Based on the above, the minimum active time is of length equal to on-duration, and the maximum is undefined (infinite).

The operation of DRX gives the mobile terminal the opportunity to deactivate the radio circuits repeatedly (according to the currently active DRX cycle) in order to save power. Whether the UE indeed remains in DRX (i.e. is not active) during the DRX period may be decided by the UE; for example, the UE usually performs inter-frequency measurements which cannot be conducted during the On-Duration, and thus need to be performed some other time, during the DRX opportunity of time.

The parameterization of the DRX cycle involves a trade-off between battery saving and latency. For example, in case of a web browsing service, it is usually a waste of resources for a UE to continuously receive downlink channels while the user is reading a downloaded web page. On the one hand, a long DRX period is beneficial for lengthening the UE's battery life. On the other hand, a short DRX period is better for faster response when data transfer is resumed—for example when a user requests another web page.

To meet these conflicting requirements, two DRX cycles—a short cycle and a long cycle—can be configured for each UE; the short DRX cycle is optional, i.e. only the long DRX cycle is used. The transition between the short DRX cycle, the long DRX cycle and continuous reception is controlled either by a timer or by explicit commands from the eNodeB. In some sense, the short DRX cycle can be considered as a confirmation period in case a late packet arrives, before the UE enters the long DRX cycle. If data arrives at the eNodeB while the UE is in the short DRX cycle, the data is scheduled for transmission at the next on-duration time, and the UE then resumes continuous reception. On the other hand, if no data arrives at the eNodeB during the short DRX cycle, the UE enters the long DRX cycle, assuming that the packet activity is finished for the time being.

During the Active Time the UE monitors PDCCH, reports SRS (Sounding Reference Signal) as configured and reports CQI (Channel Quality Information)/PMI (Precoding Matrix Indicator)/RI (Rank Indicator)/PTI (Precoder Type Indication) on PUCCH. When UE is not in Active time, type-0-triggered SRS and CQI/PMI/RI/PTI on PUCCH may not be reported. If CQI masking is set up for the UE, the reporting of CQI/PMI/RI/PTI on PUCCH is limited to On Duration.

Available DRX values are controlled by the network and start from non-DRX up to x seconds. Value x may be as long as the paging DRX used in RRC_IDLE. Measurement requirements and reporting criteria can differ according to the length of the DRX interval, i.e. long DRX intervals may have more relaxed requirements (for more details see further below). When DRX is configured, periodic CQI reports can only be sent by the UE during "active-time". RRC can further restrict periodic CQI reports so that they are only sent during the on-duration.

FIG. 7 discloses an example of DRX. The UE checks for scheduling messages (indicated by its C-RNTI, cell radio network temporary identity, on the PDCCH) during the "on duration" period of either the long DRX cycle or the short DRX cycle depending on the currently active cycle. When a scheduling message is received during an "on duration", the UE starts an "inactivity timer" and monitors the PDCCH in every subframe while the Inactivity Timer is running. During this period, the UE can be regarded as being in a continuous reception mode. Whenever a scheduling message is received while the Inactivity Timer is running, the UE restarts the Inactivity Timer, and when it expires the UE moves into a short DRX cycle and starts a "short DRX cycle timer". The short DRX cycle may also be initiated by means of a MAC Control Element. When the short DRX cycle timer expires, the UE moves into a long DRX cycle.

In addition to this DRX behaviour, a 'HARQ Round Trip Time (RTT) timer' is defined with the aim of allowing the UE to sleep during the HARQ RTT. When decoding of a downlink transport block for one HARQ process fails, the UE can assume that the next retransmission of the transport block will occur after at least 'HARQ RTT' subframes. While the HARQ RTT timer is running, the UE does not need to monitor the PDCCH. At the expiry of the HARQ RTT timer, the UE resumes reception of the PDCCH as normal.

There is only one DRX cycle per user equipment. All aggregated component carriers follow this DRX pattern.

Uplink Power Control

Uplink transmission power control in a mobile communication system serves an important purpose: it balances the need for sufficient transmitted energy per bit to achieve the required Quality of Service (QoS) against the need to minimize interference to other users of the system and to maximize the battery life of the mobile terminal. In achieving this purpose, the role of the Power Control (PC) becomes decisive to provide the required SINR while controlling at the same time the interference caused to neighbouring cells. The idea of classic PC schemes in uplink is that all users are received with the same SINR, which is known as full compensation. As an alternative, the 3GPP has adopted for LTE the use of Fractional Power Control (FPC). This new functionality makes users with a higher path-loss operate at a lower SINR requirement so that they will more likely generate less interference to neighboring cells.

Detailed power control formulae are specified in LTE for the Physical Uplink Shared Channel (PUSCH), Physical Uplink Control Channel (PUCCH) and the Sounding Reference Signals (SRSs) (for further details on the power control formulae, see for example 3GPP TS 36.213, "Evolved Universal Terrestrial Radio Access (E-UTRA); Physical layer procedures (Release 8)", version 8.8.0 or 9.1.0, section 5.1, available at http://www.3gpp.org and incorporated herein by reference). The formula for each of these uplink signals follows the same basic principles; in all cases they can be considered as a summation of two main terms: a basic open-loop operating point derived from static or semi-static parameters signaled by the eNodeB, and a dynamic offset updated from subframe to subframe.

The basic open-loop operating point for the transmit power per resource block depends on a number of factors including the inter-cell interference and cell load. It can be further broken down into two components, a semi-static base level $P_O$, further comprised of a common power level for all user equipments in the cell (measured in dBm) and a UE-specific offset, and an open-loop path-loss compensation component. The dynamic offset part of the power per resource block can also be further broken down into two components, a component dependent on the MCS and explicit Transmitter Power Control (TPC) commands.

The MCS-dependent component (referred to in the LTE specifications as $\Delta_{TF}$, where TF stands for "Transport Format") allows the transmitted power per resource block to be adapted according to the transmitted information data rate.

The other component of the dynamic offset is the UE-specific TPC commands. These can operate in two different modes: accumulative TPC commands (available for PUSCH, PUCCH and SRS) and absolute TPC commands (available for PUSCH only). For the PUSCH, the switch between these two modes is configured semi-statically for each UE by RRC signaling—i.e. the mode cannot be changed dynamically. With the accumulative TPC commands, each TPC command signals a power step relative to the previous level.

Power Headroom Reporting

In order to assist the eNodeB to schedule the uplink transmission resources to different user equipments in an appropriate way, it is important that the user equipment can report its available power headroom to eNodeB.

The eNodeB can use the power headroom reports to determine how much more uplink bandwidth per sub-frame a user equipment is capable of using. This helps to avoid allocating uplink transmission resources to user equipments which are unable to use them in order to avoid a waste of resources.

The range of the power headroom report is from +40 to −23 dB (see 3GPP TS 36.133, "Requirements for support of radio resource management", version 8.7.0, section 9.1.8.4, available at http//www.3gpp.org and incorporated in its entirety herein by reference). The negative part of the range enables the user equipment to signal to the eNodeB the extent to which it has received an UL grant which would require more transmission power than the UE has available. This would enable the eNodeB to reduce the size of a subsequent grant, thus freeing up transmission resources to allocate to other UEs.

A power headroom report can only be sent in sub-frames in which a UE has an UL transmission grant. The report relates to the sub-frame in which it is sent. The headroom report is therefore a prediction rather than a direct measurement; the UE cannot directly measure its actual transmission power headroom for the sub-frame in which the report is to be transmitted. It therefore relies on reasonably accurate calibration of the UE's power amplifier output.

A number of criteria are defined to trigger a power headroom report. These include:
  A significant change in estimated path loss since the last power headroom report
  More than a configured time has elapsed since the previous power headroom report
  More than a configured number of closed-loop TPC commands have been implemented by the UE The eNodeB can configure parameters to control each of these triggers depending on the system loading and the requirements of its scheduling algorithm. To be more specific, RRC controls power headroom reporting by configuring the two timers periodicPHR-Timer and prohibitPHR-Timer, and by signalling dl-PathlossChange which sets the change in measured downlink pathloss to trigger a power headroom report.

The power headroom report is send as a MAC Control Element. It consists of a single octet where the two highest bits are reserved and the six lowest bits represent the 64 dB values mentioned above in 1 dB steps. The structure of the MAC Control Element is shown in FIG. 8.

The UE power headroom PH [dB] valid for sub-frame i is defined by (see section 5.1.1.2 of 3GPP TS 36.213):

$$PH(i) = P_{CMAX} - \{10 \cdot \log_{10}(M_{PUSCH}(i)) + P_{0\_PUSCH}(j) + \alpha(j) \cdot PL + \Delta_{TF}(i) + f(i)\}$$ (Equation 1)

The power headroom is rounded to the closest value in the range [40; −23] dB with steps of 1 dB. $P_{CMAX}$ is the total maximum UE transmit power (or total maximum transmit power of the user equipment) and is a value chosen by user equipment in the given range of $P_{CMAX\_L}$ and $P_{CMAX\_H}$ based on the following constraints:

$$P_{CMAX\_L} \leq P_{CMAX} \leq P_{CMAX\_H}$$

$$P_{CMAX\_L} = \min(P_{EMAX} - \Delta T_C, P_{PowerClass} - MPR - AMPR - \Delta T_C)$$

$$P_{CMAX\_H} = \min(P_{EMAX}, P_{PowerClass})$$

$P_{EMAX}$ is the value signaled by the network and $\Delta T_C$, MPR and A-MPR (also denoted A-MPR—Additional Maximum Power Reduction) are specified in 3GPP TS 36.101, "Evolved Universal Terrestrial Radio Access (E-UTRA); User Equipment (UE) radio transmission and reception", version 8.7.0, section 6.2 available at http//www.3gpp.org and incorporated herein by reference.

MPR is a power reduction value, the so-called Maximum Power Reduction, used to control the Adjacent Channel Leakage Power Ratio (ACLR) associated with the various modulation schemes and the transmission bandwidth.

A-MPR is the additional maximum power reduction. It is band specific and it is applied when configured by the network. Therefore, $P_{cmax}$ is UE implementation specific and hence not known by eNB.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced. Two major technology components are described in the following.

Carrier Aggregation in LTE-A for Support of Wider Bandwidth

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same.

Not all component carriers aggregated by a user equipment may necessarily be Rel. 8/9 compatible. Existing mechanism (e.g. barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively. The transport channels are described between MAC and Layer 1, the logical channels are described between MAC and RLC.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment; the component carrier corresponding to that cell is referred to as the downlink Primary Cell (PCell). There is always one and only one downlink PCell (DL PCell) and one uplink PCell (UL PCell) configured per user equipment in connected state. In the downlink, the carrier corresponding to the PCell is the Downlink Primary Component Carrier (DL PCC), while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC), while in the uplink it is an Uplink Secondary Component Carrier (UL SCC).

The characteristics of the downlink and uplink PCell are:
For each SCell the usage of uplink resources by the UE in addition to the downlink ones is configurable (the number of DL SCCs configured is therefore always larger or equal to the number of UL SCCs, and no SCell can be configured for usage of uplink resources only)
The downlink PCell cannot be de-activated, unlike SCells
Re-establishment is triggered when the downlink PCell experiences Rayleigh fading (RLF), not when downlink SCells experience RLF
Non-access stratum information is taken from the downlink PCell
PCell can only be changed with handover procedure (i.e. with security key change and RACH procedure)
PCell is used for transmission of PUCCH
The uplink PCell is used for transmission of Layer 1 uplink control information
From a UE viewpoint, each uplink resource only belongs to one serving cell
The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). In other words, while in connected mode, UEs need not acquire broadcast system information directly from the SCells.

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Uplink Power Control for Carrier Aggregation

One main point of UL Power control for LTE-Advance is that a component carrier specific UL power control is supported, i.e. there will be one independent power control loop for each UL component carrier configured for the UE. Furthermore power headroom is reported per component carrier.

In Rel-10 within the scope of carrier aggregation there are two maximum power limits, a maximum total UE transmit power and a CC-specific maximum transmit power. RAN1 agreed at the RAN1#60bis meeting that a power headroom report, which is reported per CC, accounts for the maximum power reduction (MPR). In other words the power reduction applied by the UE is taken into account in the CC-specific maximum transmission power $P_{CMAX,c}$ (c denotes the component carrier).

Different to Rel-8/9, for LTE-A the UE has also to cope with simultaneous PUSCH-PUCCH transmission, multi-cluster scheduling and simultaneous transmission on multiple CCs, which requires larger MPR values and also causes a larger variation of the applied MPR values compared to Rel-8/9.

It should be noted that the eNB does not have knowledge of the power reduction applied by the UE on each CC, since the actual power reduction depends on the type of allocation, the standardized MPR value and also on the UE implementation. Therefore eNB doesn't know the CC-specific maximum transmission power relative to which the UE calculates the PHR. In Rel-8/9 for example UE's maximum transmit power Pcmax can be within some certain range as described above.

$$P_{CMAX\_L} \leq P_{CMAX} \leq P_{CMAX\_H}$$

Due to the fact that the power reduction applied by the UE to the maximum transmit power of a CC is not known by eNB it was agreed to introduce in Rel-10 a new power headroom MAC control element, which is also referred to as extenced power headroom MAC control element. The main difference to the Rel-8/9 PHR MAC CE format, is that it includes a Rel-8/9 power headroom value for each activated UL CC and is hence of variable size. Furthermore it not only reports the power headroom value for a CC but also the corresponding Pcmax,c (maximum transmit power of CC with the index c) value. In order to account for simultaneous PUSCH-PUCCH transmissions, UE reports for PCell the Rel-8/9 power headroom value which is related to PUSCH only transmissions (referred to type 1 power headroom) and if the UE is configured for simultaneous PUSCH-PUCCH transmission, a further Power headroom value, which considers PUCCH and PUSCH transmissions, also referred to as type 2 power headroom.

As already mentioned before the purpose of values MPR/A-MPR is to allow the mobile device to lower its maximum transmission power in order to be able to meet the requirements on signal quality, spectrum emission mask and spurious emissions.

In addition to MPR and A-MPR in Release 10 the so called power management MPR, also referred to as P-MPR, was introduced in order to account for multi-RAT terminals which may have to limit their LTE total output power particularly when simultaneous transmission on another RAT is taking place. Such power restrictions may arise, for example from regulations on Specific Absorption Rate (SAR) of radio energy into a user's body or from out-of-band emission requirements that may be affected by the intermodulation products of the simultaneous radio transmissions. The P-MPR is not aggregated with MPR/A-MPR, since any reduction in a UE's maximum output power for the latter factor helps to satisfy the requirements that would have necessitated P-MPR.

Considering now the additional power management MPR (P-MPR) the UE configures it nominal maximum transmission power $P_{CMAX}$ according to the following equations:

$$P_{CMAX\_L} \leq P_{CMAX} \leq P_{CMAX\_H}$$

$$P_{CMAX\_L} = MIN\{P_{EMAX} - \Delta T_C, P_{PowerClass} - \max(MPR + A\text{-}MPR, P\text{-}MPR) - \Delta T_C\}$$

$$P_{CMAX\_H} = MIN\{P_{EMAX}, P_{PowerClass}\}$$

For the case of carrier aggregation the Pcmax becomes Pcmax,c the component-carrier specific maximum transmission power.

In order to be able to distinguish at the eNB side whether the maximum transmission power was reduced due to MPR/A-MPR power reduction or caused by applying a P-MPR, a one bit indicator, also referred to as P-bit, was introduced in the extended power headroom MAC CE. More in particular the UE sets P=1 if the corresponding maximum transmission power ($P_{CMAX,c}$) would have had a different value if no power backoff due to power management (P-MPR) had been applied. Essentially this P bit is used by the eNB to remove the PHR reports, which are affected by P-MPR, from the MPR-learning algorithm in the eNB, i.e. eNB stores in an internal table which MPR value the UE uses for certain resource allocations.

For further details on the extended power headroom MAC Control element illustrated in FIG. 9, see for example 3GPP TS 36.321, "Evolved Universal Terrestrial Radio Access (E-UTRA); Medium Access Control (MAC) protocol specification (Release 10)", version 10.0.0, section 6.1.3.6a, available at http://www.3gpp.org and incorporated herein by reference.

In-Device Coexistence

As the demand for ubiquitous network access increases, wireless communication devices like mobile phones, tablets, PDAs, etc. are more often equipped with multiple radio transceivers, i.e. LTE, WiFi, and Bluetooth transceivers, and GNSS receivers. Due to spectrum regulation, different technology may operate in overlapping or adjacent radio spectrums. For example LTE TDD is been often operated in the 2.3-2.4 GHz frequency band, whereas WiFi operation resides in the 2.4-2.483 GHz as well as Bluetooth which is located in the frequency spectrum from 2.402-2.480 GHz. One resulting challenge lies in trying to avoid coexistence interference between those collocated radio transceivers. FIG. 10 shows an example of coexistence interference.

Simultaneous operation of multiple radio transceivers co-located within in the same physical device can cause a significant degradation among the different technologies due to extreme proximity of the different radio transceivers and the adjacent spectrum. For example the transmit power of one radio transmitter may be much higher than the received power level of another receiver. Given sufficient frequency separation and appropriate filters the transmit signal may not result in significant interference, but for some scenarios, e.g. different transceivers within the same UE operating on adjacent frequencies, current state-of-the-art filter technology might not provide sufficient protection against spurious emission. An illustration of an exemplary problem is shown in FIG. 11.

Coexistence Interference Scenario

Exemplarily shown here are coexistence interference scenarios between LTE radio and other radio technologies concerning the 3GPP frequency bands around the 2.4 GHz ISM band. The band layout is shown in FIG. 12.

LTE Coexisting with WiFi

There are 14 channels in the ISM band (from 2401 MHz to 2495 MHz) used for WiFi operation. Each channel has 5 MHz separation from the adjacent channels (with an exception of channel 14). The number of allowed channels for WiFi varies between countries (mostly 1 to 13 are allowed).

Within LTE band 40 the LTE transmitter will affect the WiFi receiver and vice-versa. As Band 7 is only used for UL communications in LTE, the WiFi receiver will be affected by LTE UL transmitter.

LTE Coexisting with Bluetooth

Bluetooth operates in 79 channels of 1 MHz each in the ISM band between 2402 MHz and 2480 MHz. Similar as WiFi case, the activities of LTE band 40 and BT will disturb each other, and the transmission of LTE in band 7 will affect the BT reception as well.

LTE Coexisting with GNSS

Examples of GNSS include GNSS systems (as GPS, Modernized GPS, Galileo, GLONASS, Space Based Augmentation Systems (SBAS), and Quasi Zenith Satellite System (QZSS)) operate in various frequencies globally with country specific deviations.

The problematic cases for collocation of LTE and GNSS include Band 13 (UL: 777-787 MHz)/14 (UL: 788-798 MHz) which can cause interference to L1/E1 frequency of GNSS (1575.42 MHz) as it is close to the second harmonics of band 13/14 (1554-1574 MHz for band 13, 1576-1596 MHz for band 14), Galileo might support 2.5 GHz for GNSS, which will be affected by band 7 LTE and Indian Regional Navigation Satellite System uses IRNSS standard position and restricted services which are transmitted on L5 (1164-1215 MHz) and S (2483.5-2500 MHz) bands, which will be affected by band 7 LTE.

Solutions to in-Device Coexistence (IDC) Problems

Standardization efforts are ongoing in 3GPP, mostly in RAN Working Group 2, and are expected to be reflected in the standard with Release 11. The following section covers the agreements reached in above indicated working group.

Two mechanisms/solutions are mainly considered for avoiding/mitigating In-device interference, referred to as TDM and FDM solution. For the frequency division multiplexing (FDM) solution the eNB will move the UE away from the current frequency to a different LTE frequency band which is not affected by the ISM interference. The TDM (Time divisional multiplexing) approach is basically to avoid simultaneous transmission/reception of interfering radio technologies. More in particular the basic concept of this solution is to ensure by configuration/scheduling that transmission of a radio signal does not coincide with reception of another radio signal. The LTE Rel-8/9/10 DRX mechanism is used in order to configure time division patterns (i.e. LTE scheduling and unscheduled periods) to resolve the IDC issues. A DRX based TDM solution should be used in a predictable way, i.e. the eNB should ensure a predictable pattern of unscheduled periods by means of the DRX mechanism.

Apart from the TDM/FDM solution a UE can autonomously deny LTE transmission to protect ISM rare cases if other solutions cannot be used. It is assumed that the UE would deny ISM transmission in order to ensure connectivity with the eNB to perform necessary procedures to resolve IDC issues.

The IDC procedure, which is also depicted in FIG. 14, is outlined in the following: the UE judges an LTE frequency as unusable when the ongoing IDC problem on this frequency between collocated LTE and ISM radio cannot be solved by the UE itself.

The assumption is that existing LTE measurements and/or UE internal coordination can be used to trigger an indication of an In-device coexistence problem. What exactly triggers the indication is left to UE implementation. It is assumed that the network can trust the UE on the assessment of the IDC problem. The message where UE informs network of on unsolvable IDM problem is referred to "IDC problem indication" message. Only ongoing IDC interference on the serving or non-serving frequencies is indicated, this means assumptions or predictions of potential interference is not triggering an IDC problem.

Within the "IDC problem indication" message UE includes all necessary/available assistant information for both frequency division multiplexing (FDM) and TDM solutions. More in detail the UE will for example include a list of frequency which are unusable due to IDC interference. Furthermore it will suggest a TDM pattern which may resolve the IDC problems on a carrier. The IDC problem indication is conveyed in a new UL-DCCH Message (i.e. RRC signalling) and can also be reused to send the updated assistant information, including the case that there is no longer an IDC problem. A prohibit mechanism is used to restrict the interval at which the UE may send IDC indications.

It should be noted that the network can configure whether UE is allowed to send an "IDC problem indication" message be means of dedicated signalling, also referred to as IDC initialisation message. The main purpose for having such an IDC initialization message is that some eNBs might not support the IDC feature, i.e. solving IDC problem by TDM/FDM configuration, due to operator policy. Therefore, in order to avoid unnecessary signalling the signalling from UE side should be configurable.

Upon reception of the IDC problem indication message, eNB decides whether and how to solve the IDC problem, i.e. by applying a DRX configuration as suggested by the UE (TDM solution) or by moving the UE to a different LTE frequency (FDM solution).

Disadvantages of the Prior Art

Besides the TDM and FDM solution which is mainly discussed within the scope of IDC, there are also considerations to use a so-called power control solution in order to reduce/avoid in-device coexistence (IDC) interference from LTE to ISM/GNSS.

One exemplary scenario is shown in FIG. 15 where the LTE UL which is located in band7 (aggressor) is causing interference to the ISM band, e.g. WiFi or Bluetooth (victim). In order to limit the interference in the WiFi receiving side caused by LTE UL transmissions, the UE may reduce its maximum transmission power. Such power reduction could be for example covered by the P-MPR usage, i.e. UE reduces its maximum transmission power autonomously by a certain P-MPR value such that reception quality on the ISM band is sufficiently good.

Since Rel-10 defines extended PHR procedure on MAC layer, the eNB may be informed of changes to the power headroom and maximum transmission power resulting from a P-MPR backoff. Current discussions in RAN2 suggest applying the existing PHR procedure also for IDC purposes. However as apparent from the following, there are certain drawbacks/deficiencies when simply using the current PHR procedure for the case of IDC.

One problem with the existent PHR procedure is that it cannot always convey information whether or not a P-MPR power reduction is applied for IDC reasons. Accordingly, the eNB might not be aware of the P-MPR power reduction which actually needs to be applied by the UE for IDC reasons. Further, existent PHR trigger condition respectively P-bit definition does also not indicate this information.

Such an absence of information may lead to situations where eNB will perform some inadequate uplink scheduling. thereby sacrificing the uplink capacity. More in detail when eNB does not recognize situations causing the UE to apply a power reduction due to IDC reasons, it may initiate allocation of an excessive amount of uplink power to the UE when issuing an uplink grant. In the end, this may lead to power scaling which does not reflect the IDC reason.

An exemplary scenario highlighting the deficiencies is illustrated in FIG. 16. Shown in FIG. 16 are PUSCH transmission power levels used by a UE at two different points in time (i.e. $T_N$ and $T_{N+1}$). Further shown are results from the power management carried out by the UE with respective values necessary for a Power Headroom Report.

At $T_N$, an PHR is triggered and subsequently sent by the UE as P-MPR backoff value is greater than some predefined threshold. Yet, the required power reduction resulting from the MPR/A-MPR values dominates the P-MPR related power reduction value. Accordingly, the extended PHR report conveys information only on the maximum output power level Pcmax based on the dominating MPR/A-MPR values and does not include any information regarding the P-MPR value. In this case, the UE would set the P-bit in the extended PHR MAC CE to 0 indicating that the power reduction is dominated by MPR/A-MPR.

Accordingly, even though the PHR has been triggered due to P-MPR power reduction exceeding some threshold, the corresponding PHR MAC CE itself may not contain information regarding a power backoff due to power management (P-MPR).

At a subsequent point in time $T_{N+1}$, it is assumed that the power backoff due to the MPR/A-MPR values has reduced and do not dominate the P-MPR related power reduction value any more. In this case, the eNB would not know what kind of maximum output power level Pcmax,c to assume for the UE. Specifically, until reception of a further extended PHR report potentially conveys information on the P-MPR related power reduction value, the eNB could conclude on any (i.e. wrong) maximum output power level Pcmax,c for the UE. Consequently this may lead to inefficient scheduling of future uplink transmissions thereby sacrificing the uplink capacity.

SUMMARY OF THE INVENTION

The present invention strives to avoid the various disadvantages mentioned above.

One object of the invention is to propose an improved maximum output power level reporting mechanism according to which, in case of a non-negligible power management related power backoff value (P-MPR), this power management related power backoff value (P-MPR) is used as a basis when determining and reporting on maximum output power levels. Another object is to allow for an improved maximum output power level reporting mechanism which conveys information on a power backoff value for avoiding in-device coexistence interference.

At least one of the above objects is solved by the subject matter of the independent claims. Advantageous embodiments are subject to the dependent claims.

According to a first aspect, the invention suggests an improved maximum output power level ($P_{CMAX}$) reporting mechanism using an extended power headroom report such that the base station (eNB) is always aware of a non-negligible power management related power backoff value (P-MPR) calculated by the mobile terminal (UE).

For this purpose, the mobile terminal, upon having calculated the power management related power backoff value (P-MPR) by referring to a reception quality level set for communication via another radio technology, determines first whether or not said value is negligible or not by comparing it to a predefined power backoff threshold value and then reports an according maximum output power level ($P_{CMAX}$) using an extended PHR.

In case of the calculated power management related power backoff value (P-MPR) exceeds the predefined power backoff threshold value, the mobile terminal advantageously sets the maximum output power level ($P_{CMAX}$) only with respect to the calculated power management related backoff value (P-MPR) and disregards other terminal specific power reduction values when calculating bounds to the maximum output power level, namely the maximum power reduction value (MPR) and the mobile terminal specific additional maximum power reduction value (A-MPR).

In other words, the lower bound to the maximum output level for the mobile terminal is calculated by setting MPR=0 dB and A-MPR=0 dB. Additionally, for this calculation the mobile terminal may either consider an allowed operating band edge transmission power relaxation value ($\Delta T_c$) or $\Delta T_c=0$ dB.

In more detail, the mobile terminal calculates upper and lower bounds to the maximum output power level $P_{CMAX}$ according to pre-specified formulae for power management. The mobile terminal may then set the maximum output power level $P_{CMAX}$ within the bounds calculated for power management.

The lower bound ($P_{CMAX\_L}$) of the formulae for power management includes evaluating a maximum between terminal specific power reduction values, namely MPR and A-MPR, and the power management related backoff value (P-MPR) calculated by the mobile terminal. In the case that the mobile terminal has set MPR=0 dB and A-MPR=0 dB, the lower bound reflects only the power management related backoff value (P-MPR) and accordingly does not reflect the terminal specific power reduction values.

Consequently, when the mobile terminal uses this lower bound ($P_{CMAX\_L}$) to set the maximum output level $P_{CMAX}$, the base station is provided with information on the power management related power backoff value (P-MPR) calculated by the mobile terminal.

According to a second aspect, the invention proposes an improved maximum output power level ($P_{CMAX}$) reporting mechanism using an in-device coexistence problem indication message. Also in this case, maximum output power level ($P_{CMAX}$) reporting is adapted such that the base station (eNB) is aware of a non-negligible power management related power backoff value (P-MPR) calculated by the mobile terminal (UE).

For this purpose, the mobile terminal calculates a power management related power backoff value (P-MPR) by referring to a reception quality level set for communication via another radio technology. Specifically, the power management related power backoff value (P-MPR) may be calculated so as to avoid in-device interference with the other radio technology.

The mobile terminal then advantageously sets the maximum output power level ($P_{CMAX}$) with respect to the calculated power management related backoff value (P-MPR). For determining the maximum output power level ($P_{CMAX}$), the mobile terminal also first calculate upper and lower bounds as defined in the pre-specified formulae for power management and the set the maximum output power level ($P_{CMAX}$) within the calculated upper and lower bounds.

In more detail, for determining the upper and lower bounds according to the per-specified formulae for power management the mobile terminal would be required to calculate the lower bound to the maximum output level by evaluating a maximum between terminal specific power reduction values, namely MPR and A-MPR, and the calculated power management related backoff value (P-MPR).

However, also in this case, the lower bound to the maximum output level is calculated by the mobile terminal setting MPR=0 dB and A-MPR=0 dB. The mobile terminal may set the maximum output power level $P_{CMAX}$ within the bounds calculated for power management.

Thereby, the mobile terminal calculates upper and lower bounds only with respect to calculated power management related backoff value (P-MPR) and disregards other terminal specific power reduction values.

Consequently, when the mobile terminal uses this calculated upper and lower bounds to set the maximum output level $P_{CMAX}$, the base station is provided with information on the power management related power backoff value (P-MPR) calculated by the mobile terminal.

The present invention provides a method for reporting a maximum output power level ($P_{CMAX}$) by a mobile terminal in a mobile communication system including a base station and a wireless communication device. The mobile terminal has a predetermined nominal mobile terminal power ($P_{PowerClass}$) and is configured with a maximum allowed mobile terminal output power ($P_{EMAX}$) for communication with the base station via one radio technology and is configured for communication with the wireless communication device via another radio technology. The mobile terminal calculates a power management related power backoff value (P-MPR) for the one radio technology by referring to a reception quality level set for communication via the other radio technology. The mobile terminal determines, whether or not the calculated power management related power backoff value (P-MPR) for the one radio technology exceeds a predefined power backoff threshold value. The mobile terminal further calculates lower and upper bounds of a maximum output power level ($P_{CMAX\_L}$;$P_{CMAX\_H}$) for the one radio technology based on the calculated power management related power backoff value (P-MPR), where the lower bound ($P_{CMAX\_L}$) and the upper bound ($P_{CMAX\_H}$) are defined by:

$$P_{CMAX\_L}=\min\{P_{EMAX}-\Delta T_c, P_{PowerClass}-\max(\text{MPR}+\text{A-MPR,P-MPR})-\Delta T_c\}$$

$$P_{CMAX\_H}=\min\{P_{EMAX}, P_{PowerClass}\}$$

The mobile terminal sets the maximum output power level ($P_{CMAX}$) for communication on the one radio technology, where the maximum output power level ($P_{CMAX}$) is set within the determined lower and upper bounds to meets the condition: $P_{CMAX\_L} \leq P_{CMAX} \leq P_{CMAX\_H}$. The mobile terminal reports the set maximum output power level ($P_{CMAX}$) using an extended power headroom report (ePHR) for the one radio technology to the base station. In case the calculated power management related power backoff value (P-MPR) exceeds the predefined power backoff threshold value, the mobile terminal calculates the lower bound ($P_{CMAX\_L}$) using MPR=0 dB, A-MPR=0 dB, and either an allowed operating band edge transmission power relaxation value ($\Delta T_c$) or $\Delta T_c$=0 dB. In case the calculated power management related power backoff value (P-MPR) does not exceed the predefined power backoff threshold value, the mobile terminal calculates lower and upper bounds ($P_{CMAX\_L}; P_{CMAX\_H}$) using a mobile terminal specific allowed maximum power reduction value (MPR), a mobile terminal specific additional maximum power reduction value (A-MPR), and an allowed operating band edge transmission power relaxation value ($\Delta T_c$).

According to an advantageous embodiment of the invention which can be used in addition or alternatively to the above, the mobile terminal reports for the one radio technology the set maximum output power level ($P_{CMAX}$) to the base station using the extended power headroom report (ePHR) including a P-bit. In case the calculated power management related power backoff value (P-MPR) exceeds the predefined power backoff threshold value, the P-bit is set to 1, and in case the calculated power management related power backoff value (P-MPR) does not exceed the predefined power backoff threshold value, the P-bit is set to 1 if MPR+A-MPR≤P-MPR and the P-bit is set to 0 if MPR+A-MPR>P-MPR.

According to an advantageous embodiment of the invention which can be used in addition or alternatively to the above, the mobile terminal reports the set maximum output power level ($P_{CMAX}$) using the extended power headroom report (ePHR) employing a medium access control, MAC, element to the base station.

According to an advantageous embodiment of the invention which can be used in addition or alternatively to the above, the mobile terminal calculates the power management related power backoff value (P-MPR) for the one radio technology such that the maximum output power level for the one and the other radio technology meets Specific Absorption Rate (SAR) requirements for the mobile terminal, or calculates the power management related power backoff value (P-MPR) for the one radio technology so as to avoid in-device interference between the one and the other radio technology.

According to an advantageous embodiment of the invention which can be used in addition or alternatively to the above, the mobile terminal calculates the power management related power backoff value (P-MPR) for the one radio technology such that the maximum output power level for the one and the other radio technology meets Specific Absorption Rate (SAR) requirements for the mobile terminal, and calculates an additional power management related power backoff value (P-MPR$_{IDC}$) for the one radio technology so as to avoid in-device interference between the one and the other radio technology. The mobile terminal calculates lower and upper bounds of a maximum output power level ($P_{CMAX\_L}$; $P_{CMAX\_H}$) for the one radio technology based on the two calculated power management related power backoff values (P-MPR,P-MPR$_{IDC}$), where the lower bound ($P_{CMAX\_L}$) and the upper bound ($P_{CMAX\_H}$) are defined by:

$$P_{CMAX\_L}=\min\{P_{EMAX}-\Delta T_c, P_{PowerClass}-\max(\text{MPR}+\text{A-MPR,P-MPR,P-MPR}_{IDC})-\Delta T_c\}$$

$$P_{CMAX\_H}=\min\{P_{EMAX}, P_{PowerClass}\}$$

wherein the lower bound ($P_{CMAX\_L}$) is calculated using MPR=0 dB, A-MPR=0 dB, P-MPR=0 dB and either an allowed operating band edge transmission power relaxation value ($\Delta T_c$) or $\Delta T_c$=0 dB.

The present invention further provides a method for reporting a maximum output power level ($P_{CMAX}$) by a mobile terminal in a mobile communication system including a base station and a wireless communication device. The mobile terminal has a predetermined nominal mobile terminal power ($P_{PowerClass}$) and is configured with a maximum allowed mobile terminal output power ($P_{EMAX}$) for communication with the base station via one radio technology and is configured for communication with the wireless communication device via another radio technology. The mobile terminal calculates a power management related power backoff value (P-MPR) for the one radio technology so as to avoid in-device interference between the one and the other radio technology, by referring to a reception quality level set for communication via the other radio technology. The mobile terminal calculates lower and upper bounds of a maximum output power level ($P_{CMAX\_L}$; $P_{CMAX\_H}$) for the one radio technology based on the calculated power management related power backoff value (P-MPR), where the lower bound ($P_{CMAX\_L}$) and the upper bound ($P_{CMAX\_H}$) are defined by:

$$P_{CMAX\_L}=\min\{P_{EMAX}-\Delta T_c, P_{PowerClass}-\max(\text{MPR}+\text{A-MPR,P-MPR})-\Delta T_c\}$$

$$P_{CMAX\_H}=\min\{P_{EMAX}, P_{PowerClass}\}$$

The mobile terminal sets a maximum output power level ($P_{CMAX}$) for communication on the one radio technology, where the configured maximum output power level ($P_{CMAX}$) is set within the determined lower and upper bounds to meets the condition: $P_{CMAX\_L} \leq P_{CMAX} \leq P_{CMAX\_H}$. The mobile terminal reports the set maximum output power level ($P_{CMAX}$) using an in-device coexistence, IDC, problem indication message for the one radio technology to the base station; wherein the lower bound ($P_{CMAX\_L}$) is calculated using MPR=0 dB, A-MPR=0 dB and either an allowed operating band edge transmission power relaxation value ($\Delta T_c$) or $\Delta T_c$=0 dB.

According to an advantageous embodiment of the invention which can be used in addition or alternatively to the above, the mobile terminal reports using the in-device coexistence, IDC, problem indication message employing a radio resource control, RRC, message via an uplink dedicated control channel, UL-DCCH, to the base station.

According to an advantageous embodiment of the invention which can be used in addition or alternatively to the above, wherein the reporting of the set maximum output power level ($P_{CMAX}$) using an in-device coexistence, IDC, problem indication message for the one radio technology to the base station is enabled when a receiver of the mobile terminal receives an in-device coexistence, IDC, initialization message for the one radio technology.

According to an advantageous embodiment of the invention which can be used in addition or alternatively to the above, the mobile terminal reduces the set maximum output power level ($P_{CMAX}$) for communication on the one radio technology within the determined lower and upper bounds based on information included in a received in-device coexistence, IDC, initialization message. In case the receiver of the mobile terminal receives the in-device coexistence, IDC, initialization message, the mobile terminal reduces the set maximum output power level ($P_{CMAX}$) before the transmitter reports the reduced maximum output power level ($P_{CMAX}$) using an in-device coexistence, IDC, problem indication message for the one radio technology to the base station.

According to an advantageous embodiment of the invention which can be used in addition or alternatively to the above, the mobile terminal calculates power management related power backoff values (P-MPR$_c$) of a plurality of uplink carriers on cells for which the mobile terminal is configured. The mobile terminal calculates upper and lower bounds of the maximum output power level ($P_{CMAX\_L,c}$; $P_{CMAX\_H,c}$) for each of the uplink carriers as defined by:

$$P_{CMAX\_L,c} = \min\{P_{EMAX} - \Delta T_c, P_{PowerClass} - \max(\text{MPR} + \text{A-MPR}, \text{P-MPR}_c) - \Delta T_c\}$$

$$P_{CMAX\_H,c} = \min\{P_{EMAX}, P_{PowerClass}\}.$$

The mobile terminal sets maximum output power levels ($P_{CMAX,c}$) for each of the uplink carriers, where the maximum output power levels ($P_{CMAX,c}$) are set within the respective determined lower and upper bounds to meets the condition: $P_{CMAX\_L,c} \leq P_{CMAX,c} \leq P_{CMAX\_H,c}$. The mobile terminal reports the set maximum output power levels ($P_{CMAX,c}$) for each of the uplink carriers to the base station.

According to an advantageous embodiment of the invention which can be used in addition or alternatively to the above, wherein the plurality of uplink carriers correspond to frequencies for which a respective measurement object is configured.

According to an advantageous embodiment of the invention which can be used in addition or alternatively to the above, the mobile terminal calculates a power management related power backoff value (P-MPR) or plural power management related power backoff values (P-MPR$_c$) for the one radio technology by referring to a reception quality level set for communication via the other radio technology is based on a reference uplink allocation for the one radio technology.

The present invention further provides a mobile terminal for reporting a maximum output power level ($P_{CMAX}$) in a mobile communication system including a base station and a wireless communication device. The mobile terminal has a predetermined nominal mobile terminal power ($P_{PowerClass}$) and is configured with a maximum allowed mobile terminal output power ($P_{EMAX}$) for communication with the base station via one radio technology and is configured for communication with the wireless communication device via another radio technology. A processor of the mobile terminal calculates a power management related power backoff value (P-MPR) for the one radio technology by referring to a reception quality level set for communication via the other radio technology. The processor of the mobile terminal determines whether or not the calculated power management related power backoff value (P-MPR) for the one radio technology exceeds a predefined power backoff threshold value. The processor of the mobile terminal calculates lower and upper bounds of a maximum output power level ($P_{CMAX\_L}$; $P_{CMAX\_H}$) for the one radio technology based on the calculated power management related power backoff value (P-MPR), where the lower bound ($P_{CMAX\_L}$) and the upper bound ($P_{CMAX\_H}$) are defined by:

$$P_{CMAX\_L} = \min\{P_{EMAX} - \Delta T_c, P_{PowerClass} - \max(\text{MPR} + \text{A-MPR}, \text{P-MPR}) - \Delta T_c\}$$

$$P_{CMAX\_H} = \min\{P_{EMAX}, P_{PowerClass}\}.$$

The processor of the mobile terminal sets the maximum output power level ($P_{CMAX}$) for communication on the one radio technology, where the maximum output power level ($P_{CMAX}$) is set within the determined lower and upper bounds to meets the condition: $P_{CMAX\_L} \leq P_{CMAX} \leq P_{CMAX\_H}$. A transmitter of the mobile terminal reports the set maximum output power level ($P_{CMAX}$) using an extended power headroom report (ePHR) for the one radio technology to the base station. In case the calculated power management related power backoff value (P-MPR) exceeds the predefined power backoff threshold value, the lower bound ($P_{CMAX\_L}$) is calculated by the processor of the mobile terminal using MPR=0 dB, A-MPR=0 dB, and either an allowed operating band edge transmission power relaxation value ($\Delta T_c$) or $\Delta T_c$=0 dB. In case the calculated power management related power backoff value (P-MPR) does not exceed the predefined power backoff threshold value, the lower and upper bounds ($P_{CMAX\_L}$; $P_{CMAX\_H}$) are calculated by the processor of the mobile terminal using a mobile terminal specific allowed maximum power reduction value (MPR), a mobile terminal specific additional maximum power reduction value (A-MPR), and an allowed operating band edge transmission power relaxation value ($\Delta T_c$).

According to an advantageous embodiment of the invention which can be used in addition or alternatively to the above, the transmitter of the mobile terminal reports for the one radio technology the set maximum output power level ($P_{CMAX}$) to the base station using the extended power headroom report (ePHR) including a P-bit. In case the calculated power management related power backoff value (P-MPR) exceeds the predefined power backoff threshold value, the P-bit is set to 1, and in case the calculated power management related power backoff value (P-MPR) does not exceed the predefined power backoff threshold value, the P-bit is set to 1 if MPR+A-MPR$\leq$P-MPR and the P-bit is set to 0 if MPR+A-MPR>P-MPR.

According to an advantageous embodiment of the invention which can be used in addition or alternatively to the above, the transmitter of the mobile terminal reports the set maximum output power level ($P_{CMAX}$) using the extended power headroom report (ePHR) employing a medium access control, MAC, element to the base station.

According to an advantageous embodiment of the invention which can be used in addition or alternatively to the above, the processor of the mobile terminal calculates the power management related power backoff value (P-MPR) for the one radio technology such that the maximum output power level for the one and the other radio technology meets Specific Absorption Rate (SAR) requirements for the mobile terminal, or calculates the power management related power backoff value (P-MPR) for the one radio technology so as to avoid in-device interference between the one and the other radio technology.

According to an advantageous embodiment of the invention which can be used in addition or alternatively to the above, the processor of the mobile terminal calculates the power management related power backoff value (P-MPR) for the one radio technology such that the maximum output power level for the one and the other radio technology meets Specific Absorption Rate (SAR) requirements for the mobile terminal, and calculates an additional power management related power backoff value (P-MPR$_{IDC}$) for the one radio technology so as to avoid in-device interference between the one and the other radio technology. The processor of the mobile terminal calculates lower and upper bounds of a maximum output power level ($P_{CMAX\_L}$; $P_{CMAX\_H}$) for the one radio technology based on the two calculated power management related power backoff values (P-MPR,P-MPR$_{IDC}$), where the lower bound (P$_{CMAX\_L}$) and the upper bound (P$_{CMAX\_H}$) are defined by:

$$P_{CMAX\_L} = \min\{P_{EMAX} - \Delta T_c, P_{PowerClass} - \max(\text{MPR} + \text{A-MPR}, \text{P-MPR}, \text{P-MPR}_{IDC}) - \Delta T_c\}$$

$$P_{CMAX\_H} = \min\{P_{EMAX}, P_{PowerClass}\}$$

wherein the lower bound (P$_{CMAX\_L}$) is calculated using MPR=0 dB, A-MPR=0 dB, P-MPR=0 dB and either an allowed operating band edge transmission power relaxation value ($\Delta T_c$) or $\Delta T_c$=0 dB.

The present invention further provides a mobile terminal for reporting a maximum output power level (P$_{CMAX}$) in a mobile communication system including a base station and a wireless communication device. The mobile terminal has a predetermined nominal mobile terminal power (P$_{PowerClass}$) and is configured with a maximum allowed mobile terminal output power (P$_{EMAX}$) for communication with the base station via one radio technology and is configured for communication with the wireless communication device via another radio technology. A processor of the mobile terminal calculates a power management related power backoff value (P-MPR) for the one radio technology so as to avoid in-device interference between the one and the other radio technology, by referring to a reception quality level set for communication via the other radio technology. The processor of the mobile terminal calculates lower and upper bounds of a maximum output power level (P$_{CMAX\_L}$;P$_{CMAX\_H}$) for the one radio technology based on the calculated power management related power backoff value (P-MPR), where the lower bound (P$_{CMAX\_L}$) and the upper bound (P$_{CMAX\_H}$) are defined by:

$$P_{CMAX\_L} = \min\{P_{EMAX} - \Delta T_c, P_{PowerClass} - \max(\text{MPR} + \text{A-MPR}, \text{P-MPR}) - \Delta T_c\}$$

$$P_{CMAX\_H} = \min\{P_{EMAX}, P_{PowerClass}\}.$$

The processor of the mobile terminal sets a maximum output power level (P$_{CMAX}$) for communication on the one radio technology, where the configured maximum output power level (P$_{CMAX}$) is set within the determined lower and upper bounds to meets the condition: P$_{CMAX\_L} \leq$ P$_{CMAX} \leq$ P$_{CMAX\_H}$. A transmitter of the mobile terminal reports the set maximum output power level (P$_{CMAX}$) using an in-device coexistence, IDC, problem indication message for the one radio technology to the base station; wherein the lower bound (P$_{CMAX\_L}$) is calculated using MPR=0 dB, A-MPR=0 dB and either an allowed operating band edge transmission power relaxation value ($\Delta T_c$) or $\Delta T_c$=0 dB.

According to an advantageous embodiment of the invention which can be used in addition or alternatively to the above, the transmitter of the mobile terminal reports using the in-device coexistence, IDC, problem indication message employing a radio resource control, RRC, message via an uplink dedicated control channel, UL-DCCH, to the base station.

According to an advantageous embodiment of the invention which can be used in addition or alternatively to the above, the reporting of the set maximum output power level (P$_{CMAX}$) using an in-device coexistence, IDC, problem indication message for the one radio technology to the base station is enabled when a receiver of the mobile terminal receives an in-device coexistence, IDC, initialization message for the one radio technology.

According to an advantageous embodiment of the invention which can be used in addition or alternatively to the above, the processor of the mobile terminal reduces the set maximum output power level (P$_{CMAX}$) for communication on the one radio technology within the determined lower and upper bounds based on information included in a received in-device coexistence, IDC, initialization message. In case the receiver of the mobile terminal receives the in-device coexistence, IDC, initialization message, the processor of the mobile terminal reduces the set maximum output power level (P$_{CMAX}$) before the transmitter reports the reduced maximum output power level (P$_{CMAX}$) using an in-device coexistence, IDC, problem indication message for the one radio technology to the base station.

According to an advantageous embodiment of the invention which can be used in addition or alternatively to the above, the processor of the mobile terminal calculates power management related power backoff values (P-MPR$_c$) of a plurality of uplink carriers on cells for which the mobile terminal is configured. The processor of the mobile terminal calculates upper and lower bounds of the maximum output power level (P$_{CMAX\_L,c}$;P$_{CMAX\_H,c}$) for each of the uplink carriers as defined by:

$$P_{CMAX\_L,c} = \min\{P_{EMAX} - \Delta T_c, P_{PowerClass} - \max(\text{MPR} + \text{A-MPR}, \text{P-MPR}, \text{P-MPR}_c) - \Delta T_c\}$$

$$P_{CMAX\_H,c} = \min\{P_{EMAX}, P_{PowerClass}\}.$$

The processor of the mobile terminal sets maximum output power levels (P$_{CMAX,c}$) for each of the uplink carriers, where the maximum output power levels (P$_{CMAX,c}$) are set within the respective determined lower and upper bounds to meets the condition: P$_{CMAX\_L,c} \leq$ P$_{CMAX,c} \leq$ P$_{CMAX\_H,c}$. The transmitter of the mobile terminal reports the set maximum output power levels (P$_{CMAX,c}$) for each of the uplink carriers to the base station.

According to an advantageous embodiment of the invention which can be used in addition or alternatively to the above, wherein the plurality of uplink carriers correspond to frequencies for which a respective measurement object is configured.

According to an advantageous embodiment of the invention which can be used in addition or alternatively to the above, the processor of the mobile terminal calculates a power management related power backoff value (P-MPR) or plural power management related power backoff values (P-MPR$_c$) for the one radio technology by referring to a reception quality level set for communication via the other radio technology based on a reference uplink allocation for the one radio technology.

The present invention further provides a computer readable medium storing instructions that, when executed by a processor of a mobile terminal, cause the mobile terminal to report a maximum output power level (P$_{CMAX}$), as follows, wherein the mobile terminal is in a mobile communication system including a base station and a wireless communication device, having a predetermined nominal mobile terminal power (P$_{PowerClass}$), being configured with a maximum allowed mobile terminal output power (P$_{EMAX}$) for communication with the base station via one radio technology, and being configured for communication with the wireless communication device via another radio technology. The mobile terminal calculates a power management related power backoff value (P-MPR) for the one radio technology by referring to a reception quality level set for communication via the other radio technology. The mobile terminal determines whether or not the calculated power management related power backoff value (P-MPR) for the one radio technology exceeds a predefined power backoff threshold value. The mobile terminal calculates lower and upper bounds of a maximum output power level (P$_{CMAX\_L}$;P$_{CMAX\_H}$) for the one radio technology based on the calculated power management related power backoff value (P-MPR), where the lower bound ($P_{CMAX\_L}$) and the upper bound ($P_{CMAX\_H}$) are defined by:

$$P_{CMAX\_L}=\min\{P_{EMAX}-\Delta T_c, P_{PowerClass}-\max(\text{MPR}+\text{A-MPR},\text{P-MPR})-\Delta T_c\}$$

$$P_{CMAX\_H}=\min\{P_{EMAX}, P_{PowerClass}\}.$$

The mobile terminal sets the maximum output power level ($P_{CMAX}$) for communication on the one radio technology, where the maximum output power level ($P_{CMAX}$) is set within the determined lower and upper bounds to meets the condition: $P_{CMAX\_L} \leq P_{CMAX} \leq P_{CMAX\_H}$. The mobile terminal reports the set maximum output power level ($P_{CMAX}$) using an extended power headroom report (ePHR) for the one radio technology to the base station. In case the calculated power management related power backoff value (P-MPR) exceeds the predefined power backoff threshold value, the lower bound ($P_{CMAX\_L}$) is calculated using MPR=0 dB, A-MPR=0 dB, and either an allowed operating band edge transmission power relaxation value ($\Delta T_c$) or $\Delta T_c$=0 dB. In case the calculated power management related power backoff value (P-MPR) does not exceed the predefined power backoff threshold value, the lower and upper bounds ($P_{CMAX\_L}$; $P_{CMAX\_H}$) are calculated using a mobile terminal specific allowed maximum power reduction value (MPR), a mobile terminal specific additional maximum power reduction value (A-MPR), and an allowed operating band edge transmission power relaxation value ($\Delta T_c$).

The present invention further provides a computer readable medium storing instructions that, when executed by a processor of a mobile terminal, cause the mobile terminal to report a maximum output power level ($P_{CMAX}$), as follows, wherein the mobile terminal is in a mobile communication system including a base station and a wireless communication device, having a predetermined nominal mobile terminal power ($P_{PowerClass}$), being configured with a maximum allowed mobile terminal output power ($P_{EMAX}$) for communication with the base station via one radio technology, and being configured for communication with the wireless communication device via another radio technology. The mobile terminal calculates a power management related power backoff value (P-MPR) for the one radio technology so as to avoid in-device interference between the one and the other radio technology, by referring to a reception quality level set for communication via the other radio technology. The mobile terminal calculates lower and upper bounds of a maximum output power level ($P_{CMAX\_L}$;$P_{CMAX\_H}$) for the one radio technology based on the calculated power management related power backoff value (P-MPR), where the lower bound ($P_{CMAX\_L}$) and the upper bound ($P_{CMAX\_H}$) are defined by:

$$P_{CMAX\_L}=\min\{P_{EMAX}-\Delta T_c, P_{PowerClass}-\max(\text{MPR}+\text{A-MPR},\text{P-MPR})-\Delta T_c\}$$

$$P_{CMAX\_H}=\min\{P_{EMAX}, P_{PowerClass}\}.$$

The mobile terminal sets a maximum output power level ($P_{CMAX}$) for communication on the one radio technology, where the configured maximum output power level ($P_{CMAX}$) is set within the determined lower and upper bounds to meets the condition: $P_{CMAX\_L} \leq P_{CMAX} \leq P_{CMAX\_H}$. The mobile terminal reports the set maximum output power level ($P_{CMAX}$) using an in-device coexistence, IDC, problem indication message for the one radio technology to the base station; wherein the lower bound ($P_{CMAX\_L}$) is calculated using MPR=0 dB, A-MPR=0 dB and either an allowed operating band edge transmission power relaxation value ($\Delta T_c$) or $\Delta T_c$=0 dB.

The computer readable medium according to a further embodiment of the invention is storing instructions that, when executed by a processor of a mobile terminal, cause the mobile terminal to perform the steps of the method for reporting a maximum output power level ($P_{CMAX}$) by a mobile terminal in a mobile communication system according to one of the various exemplary embodiments described herein.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
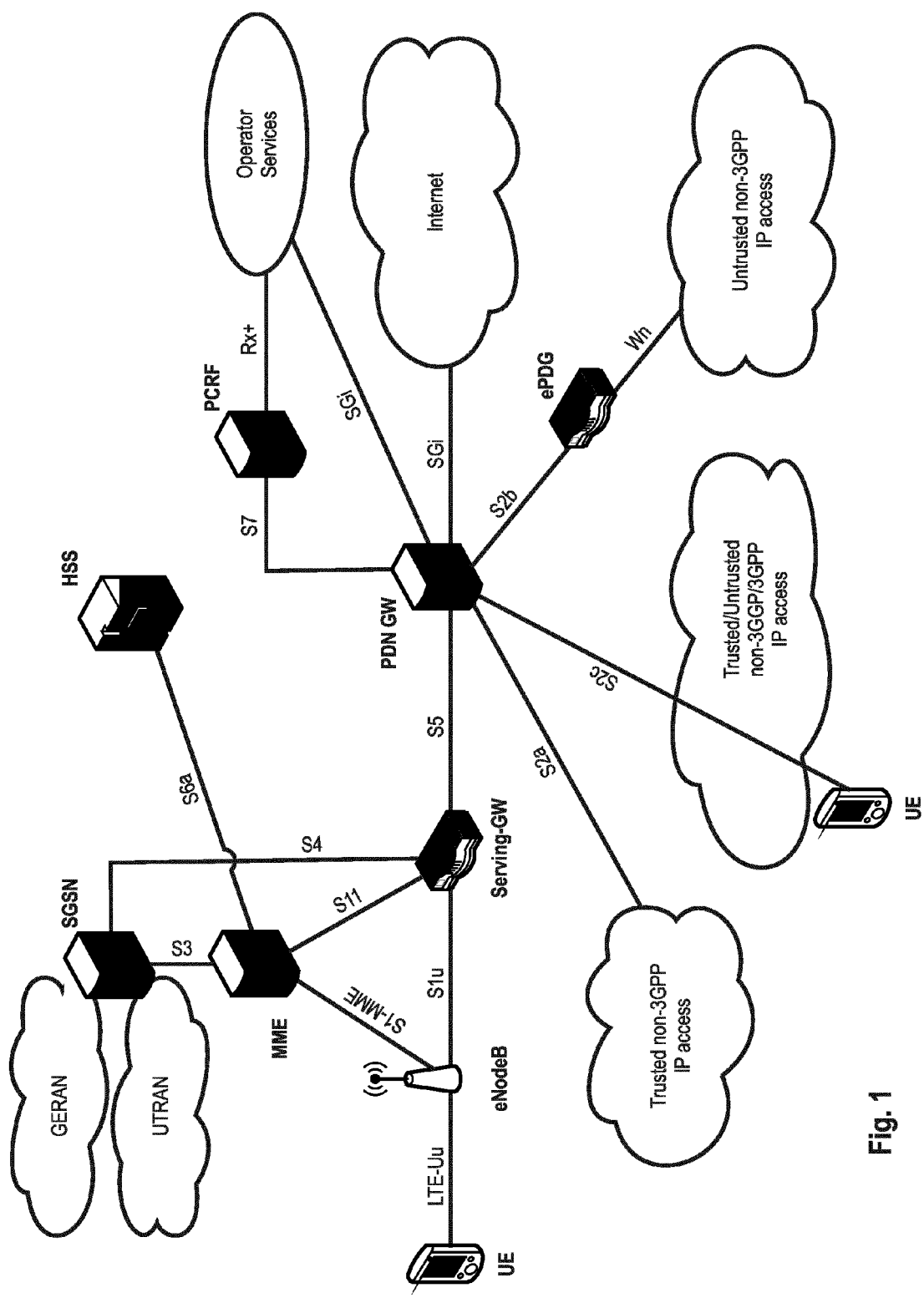
FIG. 1 shows an exemplary architecture of a 3GPP LTE system.
Figure 2:
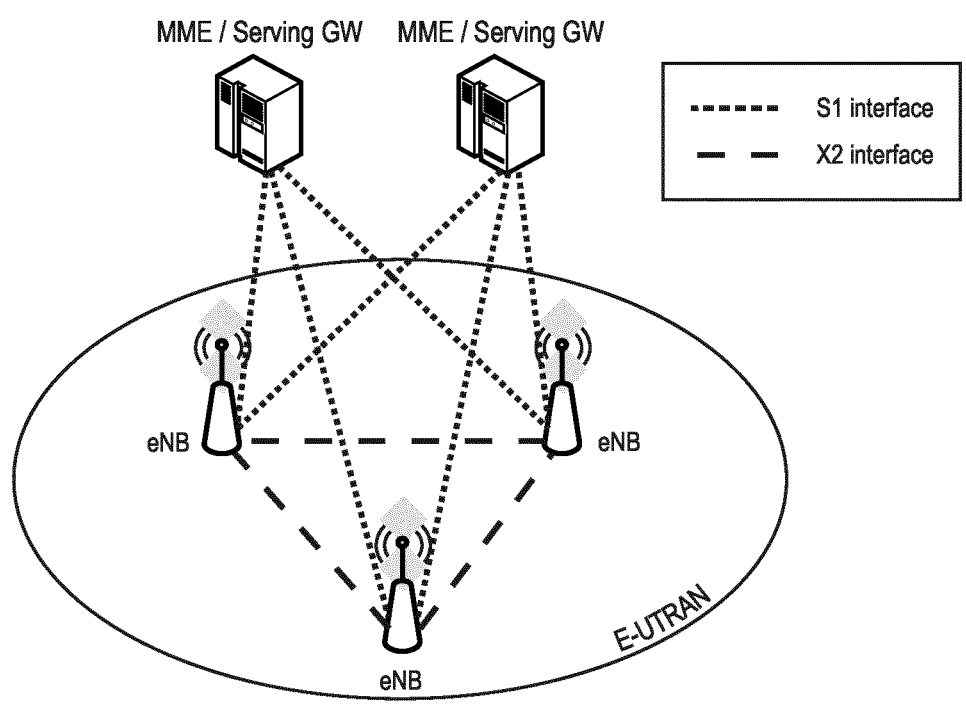
FIG. 2 shows an exemplary overview of the overall E-UTRAN architecture of 3GPP LTE.
Figure 3:
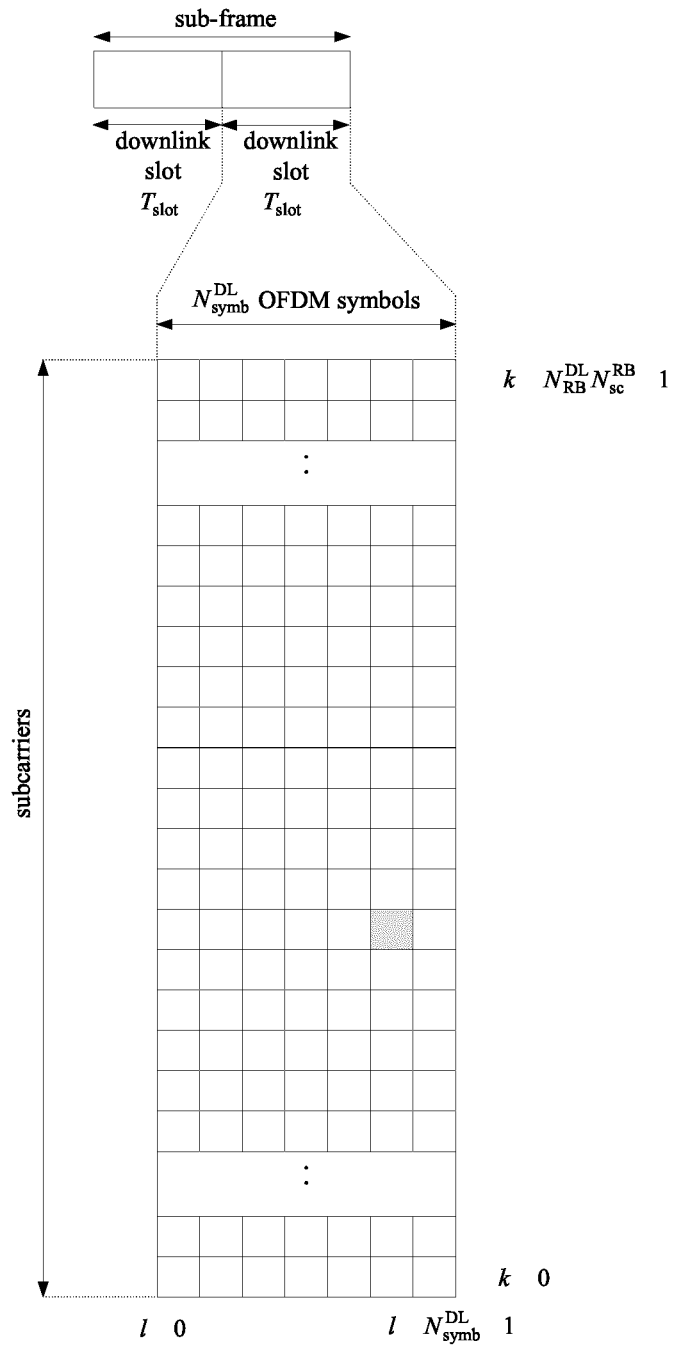
FIG. 3 shows an exemplary sub-frame boundaries on a downlink component carrier as defined for 3GPP LTE (Release 8/9)
Figure 4:
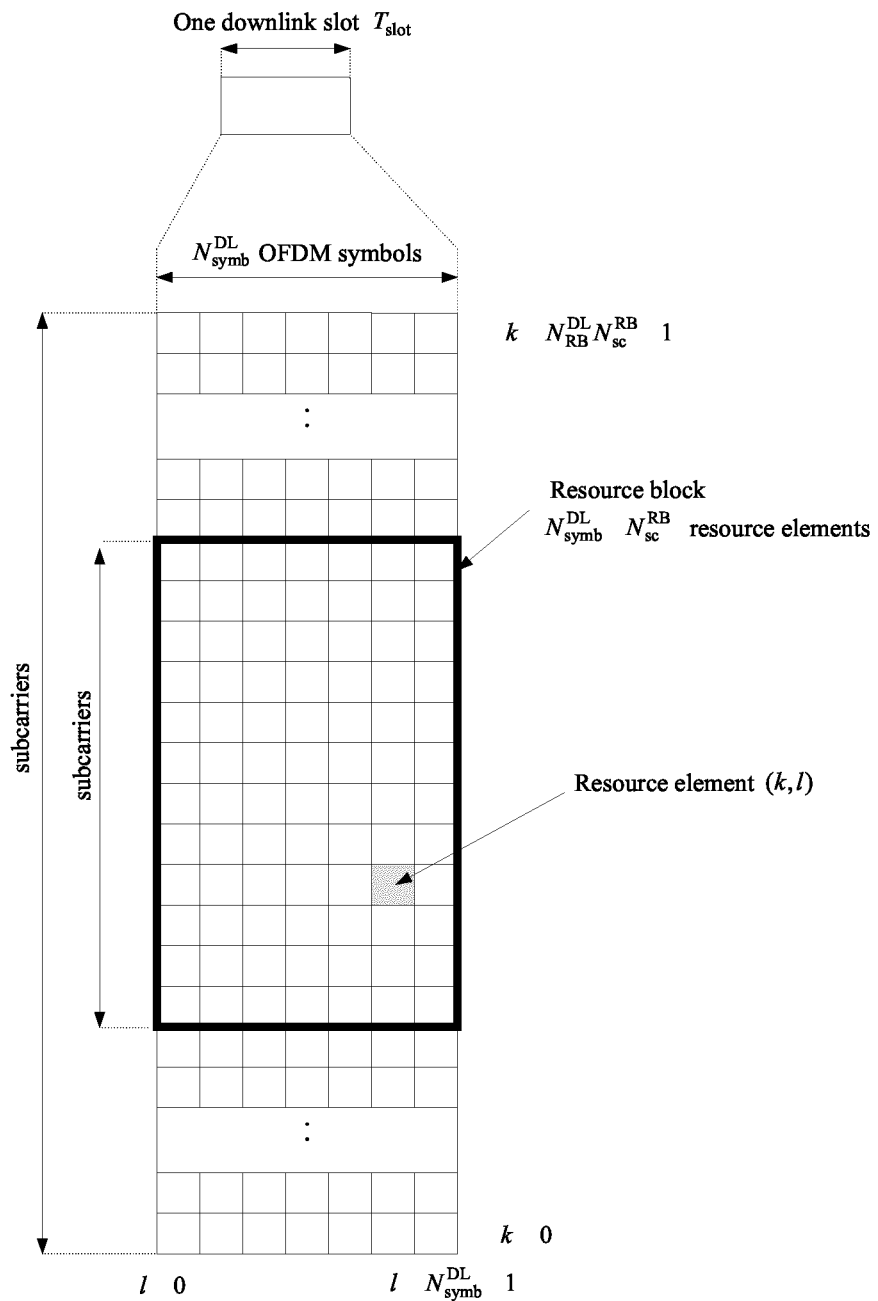
FIG. 4 shows an exemplary downlink resource grid of a downlink slot as defined for 3GPP LTE (Release 8/9)
Figure 5:
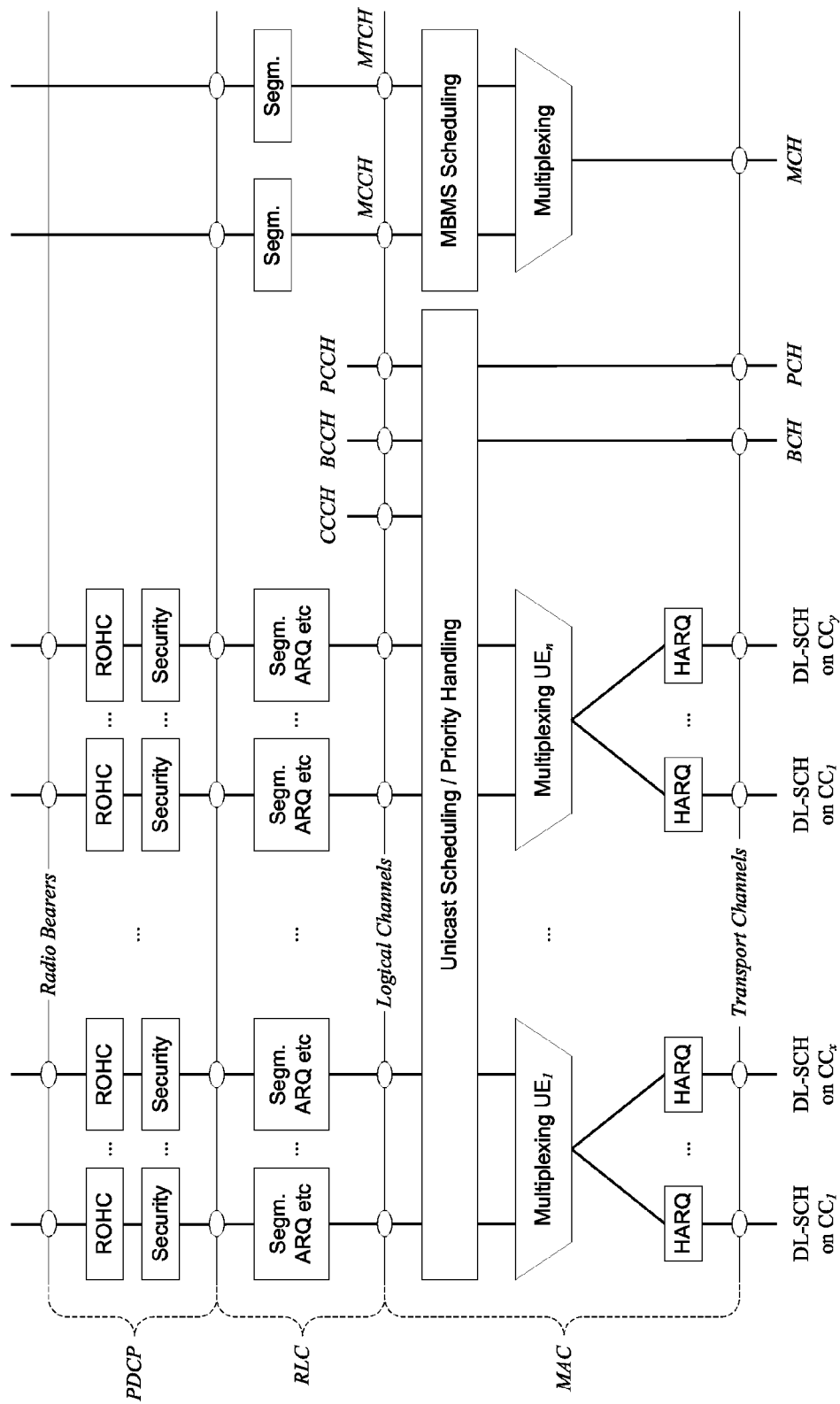
FIGS. 5 & 6 show the 3GPP LTE-A (Release 10) Layer 2 structure with activated carrier aggregation for the downlink and uplink, respectively.
Figure 6:
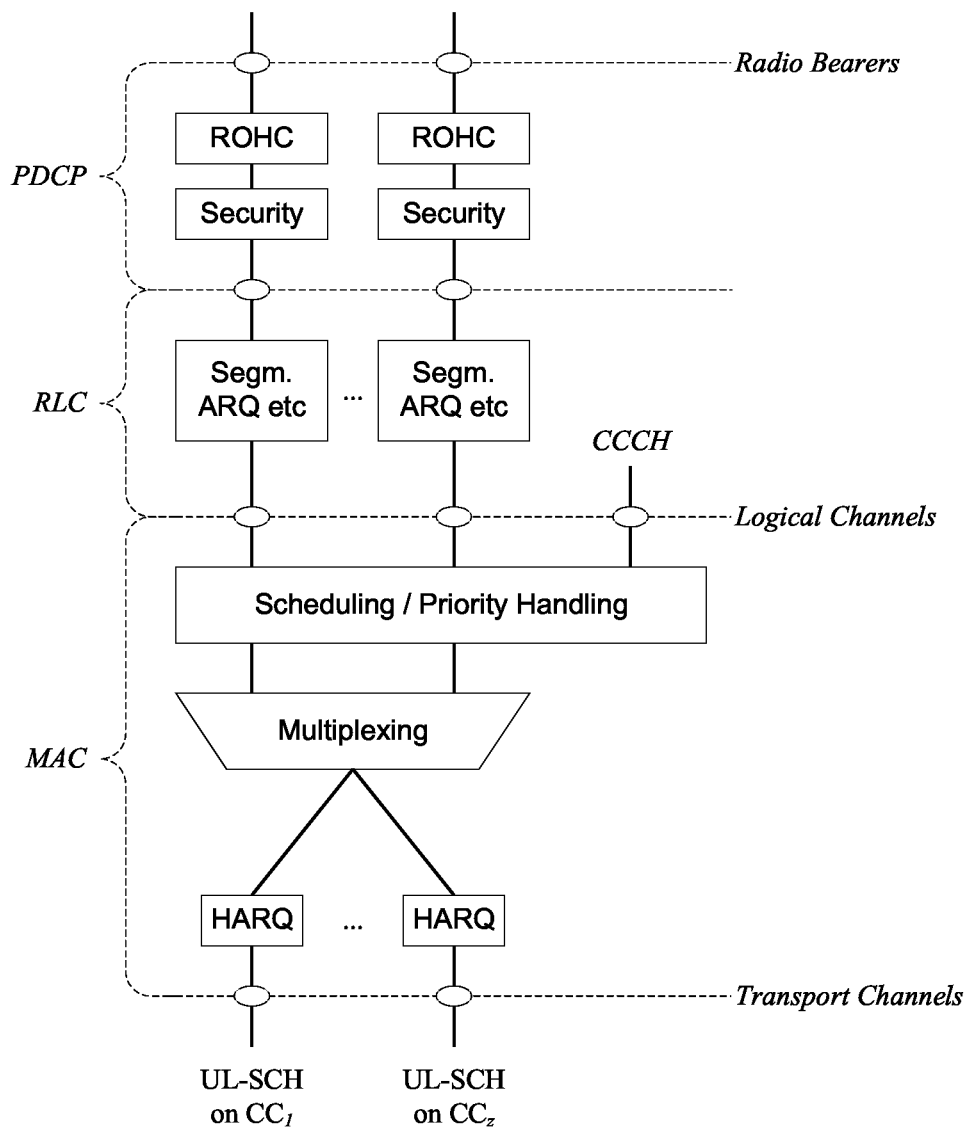
Figure 7:
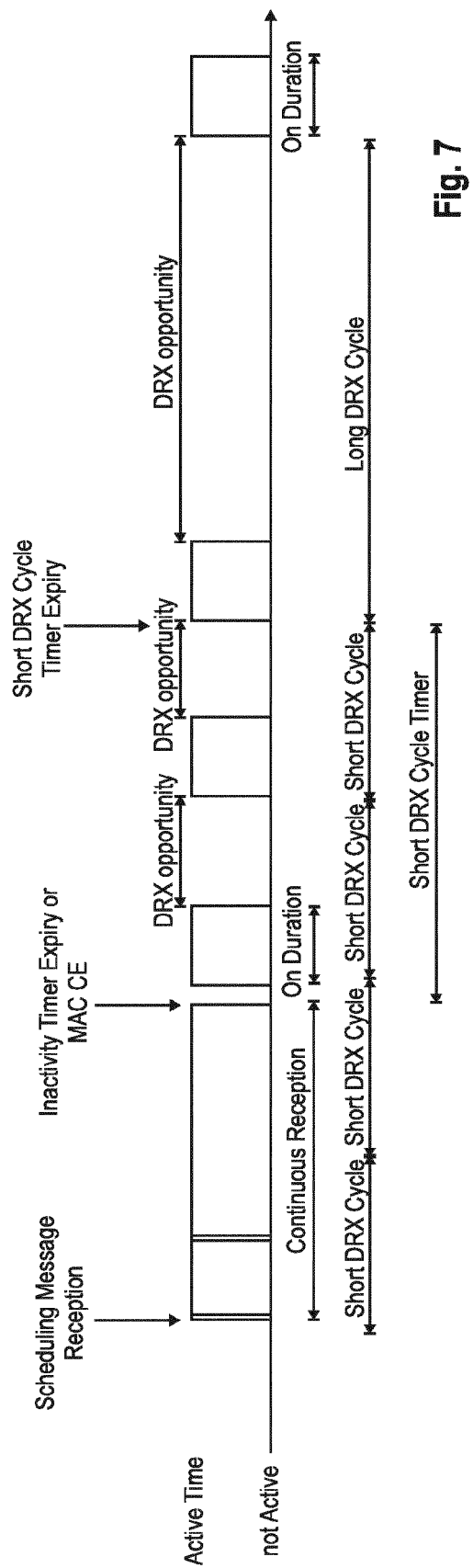
FIG. 7 illustrates a DRX operation of a mobile terminal and in particular the DRX opportunity, on-duration, according to the short and long DRX cycle.
Figures 8, 9:
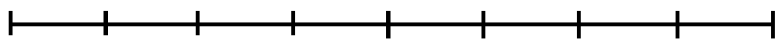
FIG. 8 shows a Power Headroom Report, PHR, MAC control element as defined in 3GPP LTE (Release 8/9)
FIG. 9 illustrates an extended Power Headroom Report, ePHR, MAC control element as defined in 3GPP LTE (Release 10)
Figure 10:
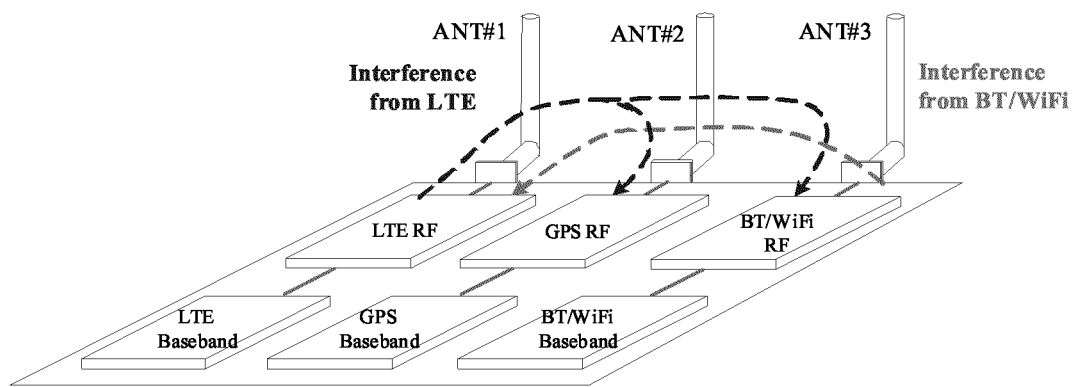
FIG. 10 shows examples of coexistence interference between coexisting transceivers of a user equipment, FIG. 11 exemplary illustrates coexistence interference between an in-device ISM transmitter and an E-UTRA receiver.
Figure 11:
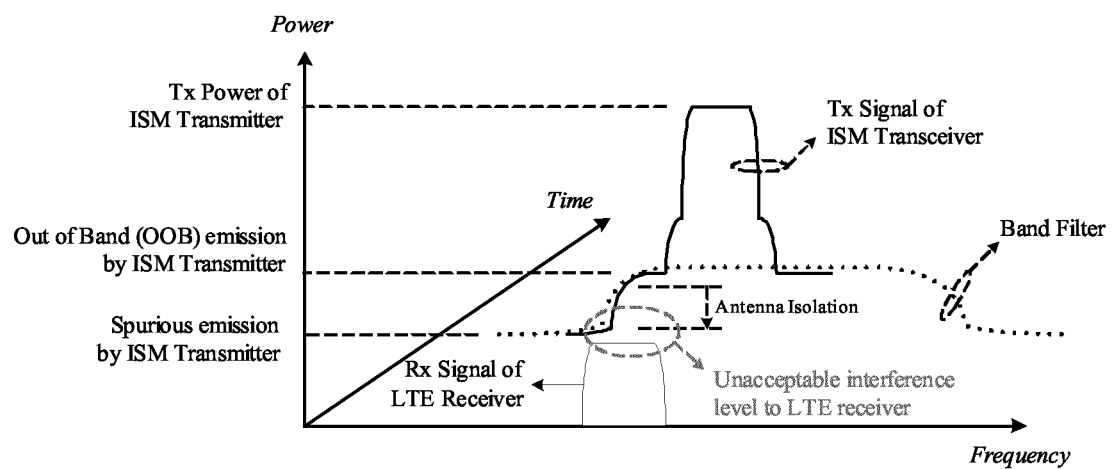
Figure 12:
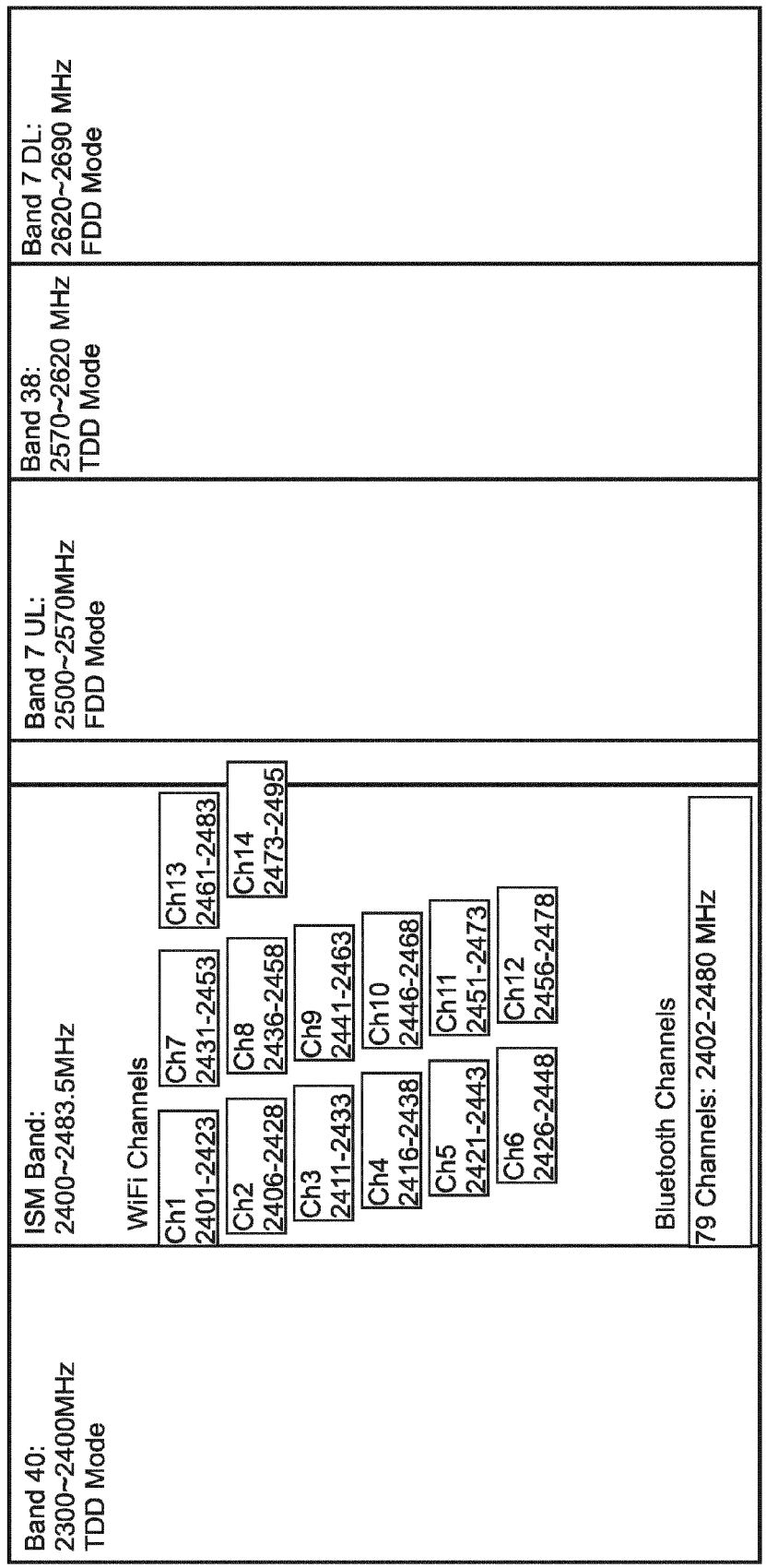
FIG. 12 shows examples of co-location of 3GPP frequency bands and ISM frequency bands, and the usage thereof for specific communication technologies, FIG. 13 exemplifies a DRX operation of a mobile terminal for resolving coexistence interference according to a TDM solution.
Figure 13:
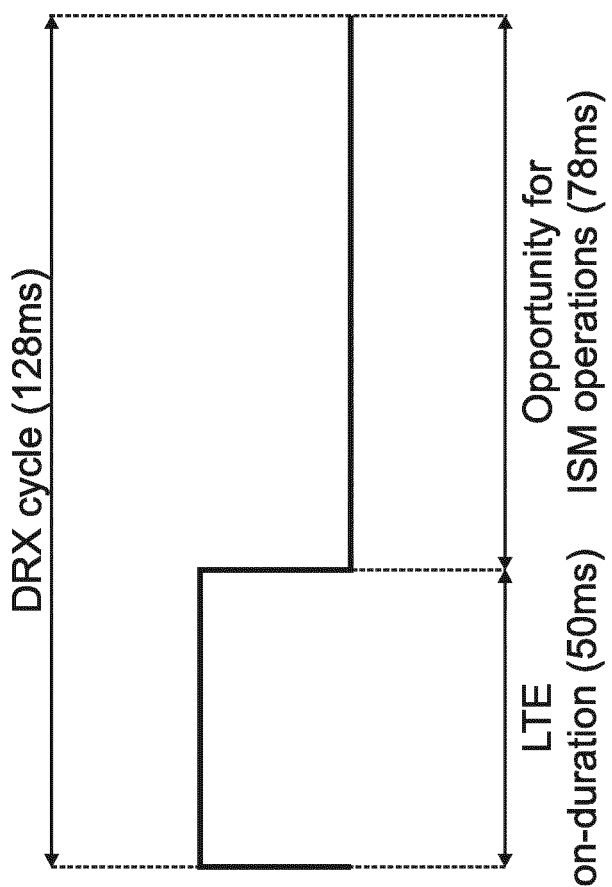
Figure 14:
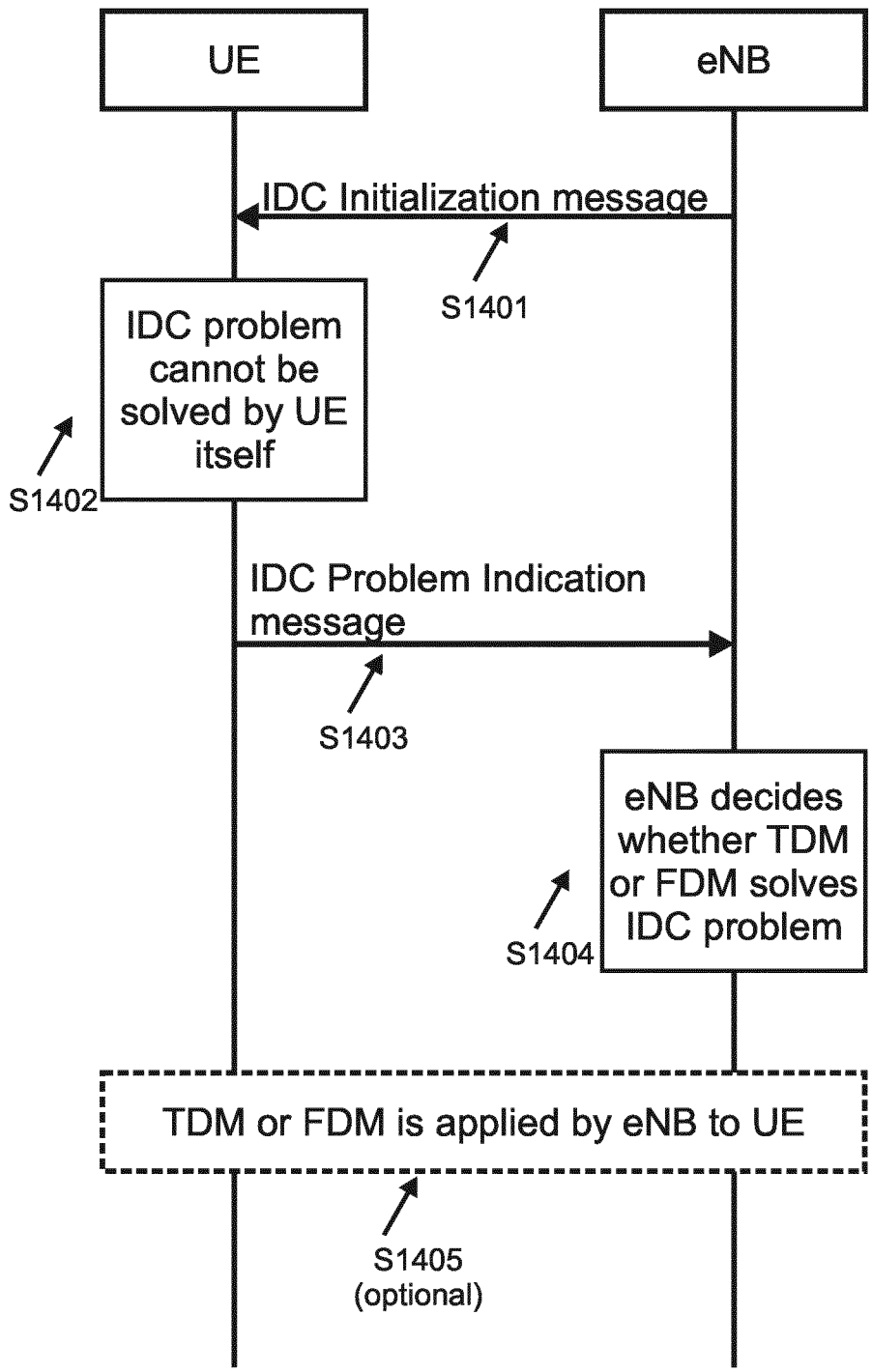
FIG. 14 illustrates an exemplary signaling diagram for use in an in-device coexistence scenario as defined in 3GPP LTE (Release 10)
Figure 15:
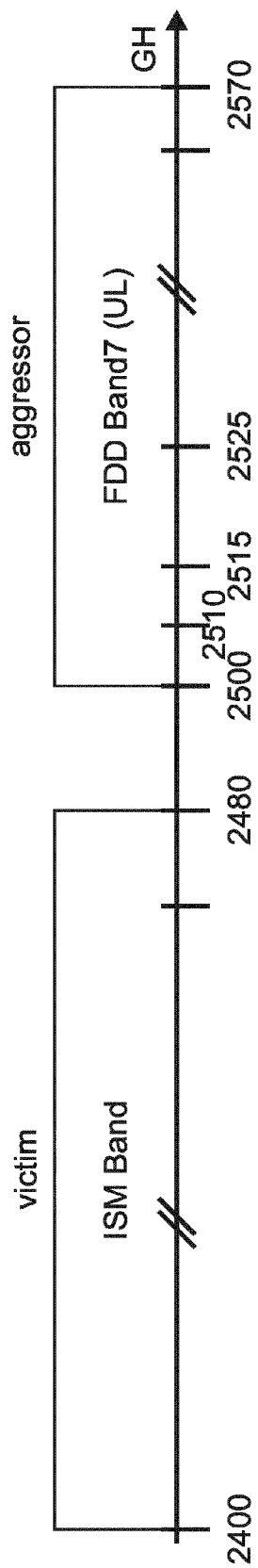
FIG. 15 shows a co-location of a 3GPP frequency band and the ISM band to exemplify coexistence interference between an ISM receiver and an E-UTRAN transmitter.
Figure 16:
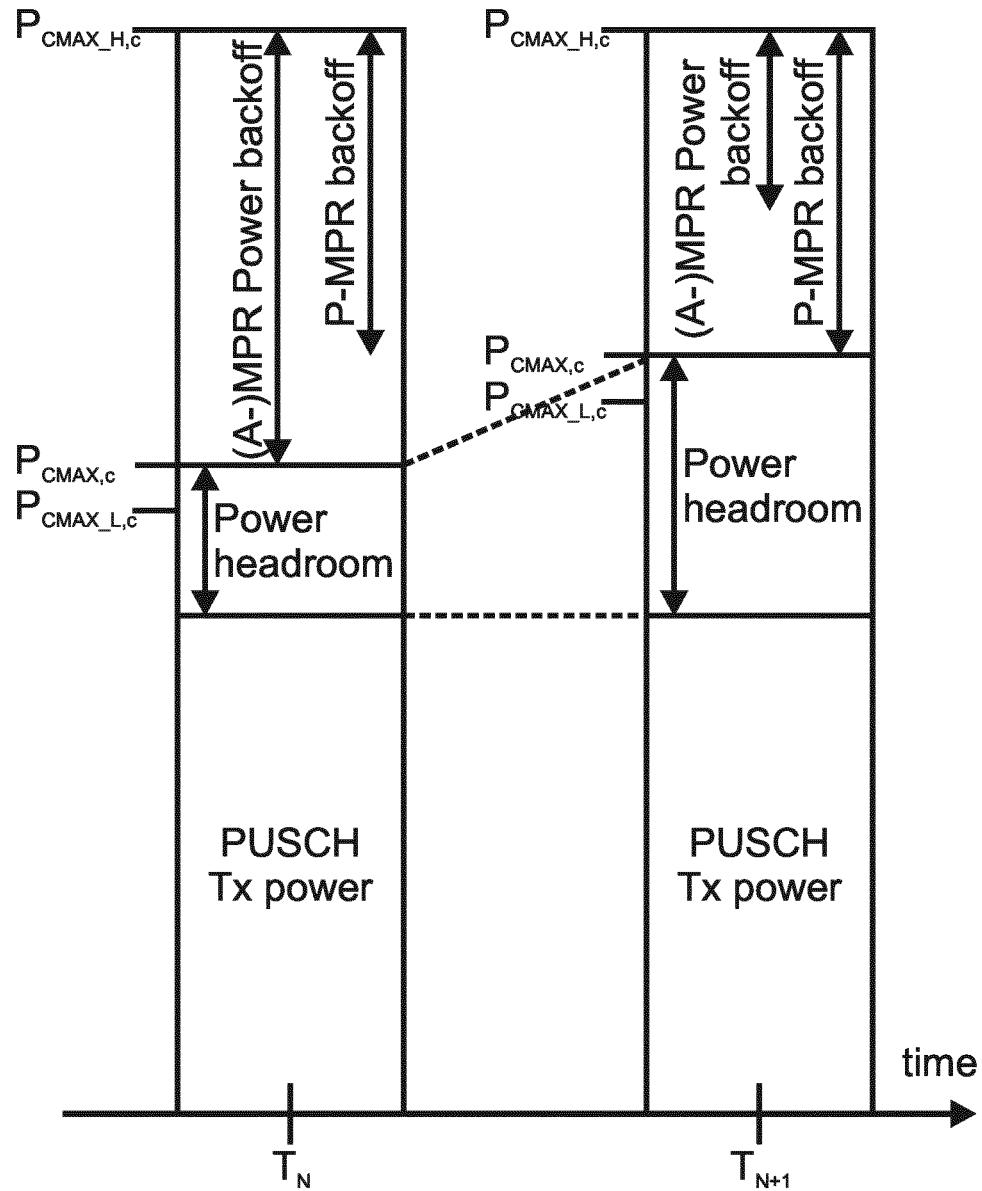
FIG. 16 illustrates problems when reporting a maximum output power level by the UE signaling in an exemplary scenario according to the prior art.

The following paragraphs will describe various embodiments of the invention. For exemplary purposes only, most of the embodiments are outlined in relation to an orthogonal single-carrier uplink radio access scheme according to 3GPP LTE (Release 8/9) and LTE-A (Release 10) mobile communication systems discussed in the Technical Background section above. It should be noted that the invention may be advantageously used for example in a mobile communication system such as 3GPP LTE (Release 8/9) and LTE-A (Release 10) communication systems as described in the Technical Background section above, but the invention is not limited to its use in this particular exemplary communication network. The invention may be broadly used in communication systems where time alignment of uplink transmissions on multiple carriers (having different propagation delays) is desired.

The explanations given in the Technical Background section above are intended to better understand the mostly 3GPP LTE (Release 8/9) and LTE-A (Release 10) specific exemplary embodiments described herein and should not be understood as limiting the invention to the described specific implementations of processes and functions in the mobile communication network.

The term "wireless communication device" is used in the following description to refer to any kind of device allowing for wireless communication with the mobile terminal according to the invention. In the specific in-device coexistence scenario focussed on in the invention, the "wireless communication device" may be a device enabled for communication via ISM/GSSN frequency bands. Exemplary, devices can be a WIFI access point or WIFI router, a Bluetooth headset, a Bluetooth stereo system, or even a GSSN satellite.

The invention aims to provide an efficient power management control for uplink transmissions by a base station (eNodeB or Node B in the 3GPP context) in a scenario where a mobile terminal (user equipment in the 3GPP context) is assumed to operate multiple in-device transceiver modules for different radio technologies in a same transmission time interval (e.g. one or more sub-frames). For this purpose, the invention utilizes an improved maximum output power reporting mechanism from the mobile terminal to convey information on a calculated power management related power backoff value (P-MPR) to the base station at all significant times. The invention also allows the mobile terminal to convey information on a power management related power backoff value to the base station for avoiding in-device coexistence interference.

A consideration underlying this invention is that a power management control is already specified for mobile terminals in 3GPP LTE (Release 8/9) and LTE-A (Release 10). There, formulae for power management are defined and the implementation thereof in a mobile terminal complying with the standards is required.

However, as explained with respect to the technical background section, the formulae are designed to only approximate an efficient power management control by the base station as they disregard scenarios where an in-device coexistence interference situation is possible. Also in scenarios where Specific Absorption Rate (SAR) requirements are imposed on mobile terminals, the application of the formulae for power management may lead to an inefficient power scaling for future uplink transmissions at mobile terminals.

In other words, with the existing PHR procedure and even with the definition of the P-bit, there is no guarantee that a PHR being triggered due to a significant change of the P-MPR, specifically the corresponding PHR MAC CE, actually contains any information on the used P-MPR power reduction required for proper scheduling of future uplink transmissions by the mobile terminal.

In this respect, an aspect of the invention is to adapt the formulae for power management to consider an actual power management related power backoff and to allow conveying according information to the base station at all significant times. This is achieved by ensuring that a power management related power reduction (P-MPR) information is indicated by the mobile terminal to base station when PHR is triggered by a P-MPR backoff exceeding a predefined threshold.

Another aspect is to enable a mobile terminal for reporting on a maximum output power level ($P_{CMAX}$) in case of in-device coexistence interference also by using an in-device coexistence problem indication message.

Figure 17:
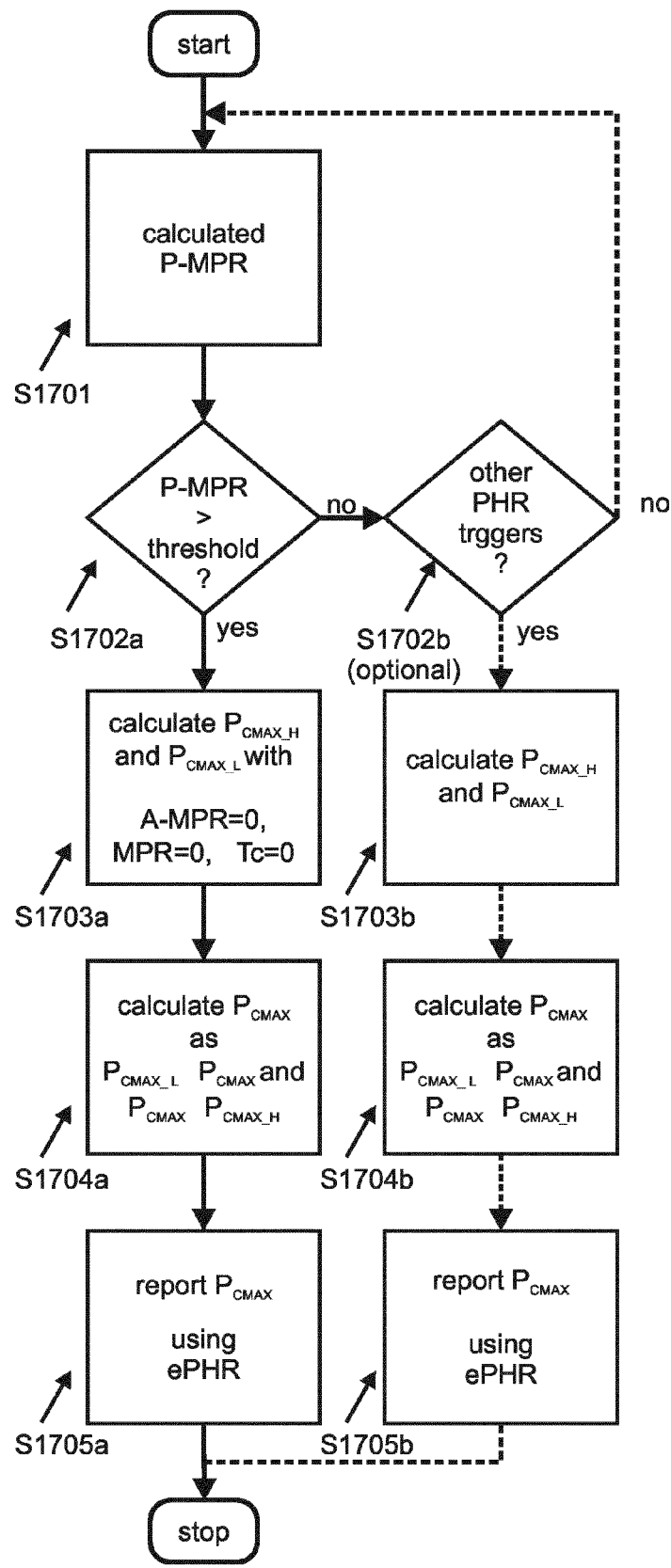
FIG. 17 shows a sequence diagram of an improved maximum output power level reporting mechanism of a user equipment according to one embodiment of the invention.

Referring to FIG. 17, a sequence diagram of an improved maximum output power level reporting mechanism of a user equipment according to one embodiment of the invention is shown. In this embodiment it is the main idea to set the MPR, A-MPR value to zero dB for the calculation of Pcmax,c in case of PHR reports triggered by a P-MPR power reduction exceeding a predefined threshold. This will be exemplified in more detail in the following. In a variation also $\Delta Tc$ is set to zero dB for the calculation of Pcmax,c.

As shown in step S1701, the power management procedure carried out by a mobile terminal includes calculation of a power management related power backoff value (P-MPR). The power management related power backoff value (P-MPR) reflects changes in the allowed maximum output power which can be utilized by the mobile terminal for PUSCH/PUCCH transmission on the cell. Moreover, the calculated power management related backoff value (P-MPR) may change to ensure compliance with applicable electronic energy absorption requirements and may address unwanted emission to co-located frequency bands or self defense requirements in case of simultaneous transmissions on multiple radio technologies.

Then, the mobile terminal evaluates, in step S1702a, whether or not the calculated power management related power backoff value (P-MPR) exceeds a predefined power backoff threshold value. Specifically, this evaluation can be seen as a trigger condition for a Power Headroom Report. There exist various other triggers for Power Headroom Reports, PHRs, which shall be of less concern to the present invention.

In particular, as indicated in step S1702b, the mobile terminal may evaluate whether or not other trigger conditions are met and may also carry out reporting of a set maximum output power level (Pcmax) using an extended power headroom report, shown in step S1705b. However, this mechanism is only illustrated for sake of completeness and should not be understood as limiting the invention.

Having determined that the calculated power management related power backoff value (P-MPR) exceeds the predefined power backoff threshold value, the mobile terminal proceeds in step S1703a with calculating upper and lower bounds of a maximum output power level. Specifically, in the section titled "Power Headroom Reporting" of the Technical Background, the formulae for calculating upper and lower bounds of a maximum output power level have been prescribed as follows:

$$P_{CMAX\_L} = \min\{P_{EMAX} - \Delta T_c, P_{PowerClass} - \max(\text{MPR} + \text{A-MPR}, \text{P-MPR}) - \Delta T_c\}$$

$$P_{CMAX\_H} = \min\{P_{EMAX}, P_{PowerClass}\}.$$

However, it is the particular approach for the mobile terminal to disregard other power reduction values when calculating upper and lower bounds to the maximum output power level in step S1703a, namely the maximum power reduction value (MPR) and the additional maximum power reduction value (A-MPR) and optionally the allowed operating band edge transmission power relaxation value ($\Delta T_c$).

In this respect, when setting MPR, A-MPR and $\Delta Tc$ value to zero dB the formulae simplify to:

$$P_{CMAX\_L,C} = \text{MIN}\{P_{EMAX}, P_{PowerClass} - \text{P-MPR}\}$$

$$P_{CMAX\_H,C} = \text{MIN}\{P_{EMAX}, P_{PowerClass}\}$$

Consequently, a mobile terminal calculating the upper and lower bounds to the maximum output power level with MPR=0 dB, A-MPR=0 dB and $\Delta T_c$=0 dB ensures that the bounds will only reflect the power management related power backoff value (P-MPR), namely in the lower bound ($P_{CMAX\_L}$).

Having calculated the upper and lower bounds to the maximum output power level with MPR=0 dB, A-MPR=0 dB and $\Delta T_c$=0 dB, the mobile terminal sets, in step 1704a, a maximum output power level ($P_{CMAX}$) within the determined bounds, namely such that it meets the condition $P_{CMAX\_L} \leq P_{CMAX} \leq P_{CMAX\_H}$. The setting of a maximum output level ($P_{CMAX}$) by the mobile terminal is implementation specific and may reflect additional values of concern to the manufacturers of the mobile terminal.

Nevertheless, it can be readily appreciated that the maximum output power level ($P_{CMAX}$) predominantly accords with the bounds determined based on the calculated power management related power backoff value (P-MPR) and not based on other power reduction values: MPR, A-MPR or $\Delta T_c$. In other words, maximum output power level ($P_{CMAX}$) is only accounting for the power management related power reduction.

Consequently, when reporting by the mobile terminal, in step S1705a, the set maximum output power level ($P_{CMAX}$) using an extended Power Headroom Report, the base station is provided with information on the power management related power backoff value (P-MPR). Then, the base station can derive from a received $P_{CMAX}$ value information on the P-MPR value used by the mobile terminal since for setting the $P_{CMAX}$ value, the P-MPR has been the only type of power reduction considered by the mobile terminal.

For consistency reasons, it shall be mentioned that the extended Power Headroom Report used in reporting step S1705a may additionally include a P-bit set to 1, as the calculated P-MPR value has been used for calculating the lower bound in step S1703a. The definition of the P-bit should, however, not be understood as limiting the invention.

In summary, by the mobile terminal setting MPR, A-MPR and $\Delta Tc$ to zero dB for those PHRs which are triggered by a P-MPR exceeding some predefined threshold, it is ensured that base station is provided with information on the used P-MPR value.

The step S1702a assumes that the lower bound ($P_{CMAX\_L}$) is calculated by the mobile terminal setting $\Delta T_c$=0 dB. According to another variation of this embodiment, it is evident, that the same effect of reporting a $P_{CMAX}$ value, considering the P-MPR as the only type of power reduction, can also be achieved when calculating the lower bound with the allowed operating band edge transmission power relaxation value for $\Delta T_c$.

It is apparent from the above discussion with respect to FIG. 17, that, according to a variation to the first embodiment, in case of reporting uplink carrier specific power management related power backoff values (P-MPR$_c$), all above described processing and calculation steps S1701, S1702a, S1703a, S1704a and S1705a can be performed separately for a specific uplink carrier. The uplink carrier is indicated via index c.

According to another variation of the first embodiment, the mobile terminal is configured to calculate the "conventional" power management related backoff value (P-MPR) and an "additional" IDC related power backoff value (P-MPR$_{IDC}$). This variation ensures that only power reductions for in-device coexistence interference avoidance is accounted for in the $P_{CMAX}$ calculation.

Exemplary, the "conventional" power backoff value (P-MPR) may reflect the maximum output power level for the LTE UL transmitter in order to meet Specific Absorption Rate (SAR) requirements for the mobile terminal. The additional IDC related power backoff value (P-MPR$_{IDC}$) is calculated so as to avoid in-device interference between the one and the other radio technology. In other words, P-MPR can be also used by the mobile terminal (UE) in order to comply with SAR requirements and the additional IDC related P-MPR value may be used to reflect power reductions for in-device coexistence interference avoidance.

According to this variation, after having determined the "conventional" power backoff value (P-MPR) and an "additional" IDC related power backoff value (P-MPR$_{IDC}$), the mobile terminal would proceed with calculating the upper and lower bounds of the maximum output power level. In this particular case, the equations for the calculation of $P_{CMAX\_L,C}$ and $P_{CMAX\_H,C}$ as a basis for setting $P_{cmax}$ would be:

$$P_{CMAX\_L,C} = \text{MIN}\{P_{EMAX} - \Delta T_C, P_{PowerClass} - \max(\text{MPR+A-MPR, P-MPR, P-MPR}_{IDC}) - \Delta T_c\}$$

$$P_{CMAX\_H,C} = \text{MIN}\{P_{EMAX}, P_{PowerClass}\}.$$

However, also in this case, when the calculated IDC related power backoff value (P-MPR$_{IDC}$) exceeds the predefined power backoff threshold value, the mobile terminal will for the calculation of $P_{cmax}$ to be reported in extended Power Headroom Report message, calculated the upper and lower bounds for the maximum output level by setting MPR, A-MPR, $\Delta Tc$ and P-MPR is set to zero dB. Thereby it's ensured that only power reductions which are done for IDC reasons are accounted for in the $P_{cmax}$ value.

Focusing now on the case that P-MPR was calculated for the mobile terminal to react when experiencing in-device coexistence interference, also termed IDC scenario, the mobile terminal (UE) may autonomously reduce its maximum transmission power in order not to be affected too strong by interference between the E-UTRAN transmitter and an ISM/GNSS receiver. Assuming that the P-MPR value exceeds the predefined threshold, by reporting an according set maximum output power level ($P_{CMAX}$) the base station (eNB) is aware of this power reduction and hence can use this information for proper uplink scheduling.

In summary, one advantage of the first embodiment is that the regular PHR reports are not affected by this solution, i.e. only P-MPR triggered PHR reports are manipulated; other remaining "regular" PHR reports are not affected.

In the above described first embodiment, the current PHR reporting procedure is used in order to provide the base station (eNB) information on power reduction required due to IDC reasons. Consequently, the extended PHR MAC CE conveys information on the power back off value which allows a more optimized scheduling of future uplink transmission by the mobile terminal (UE).

Figure 18:
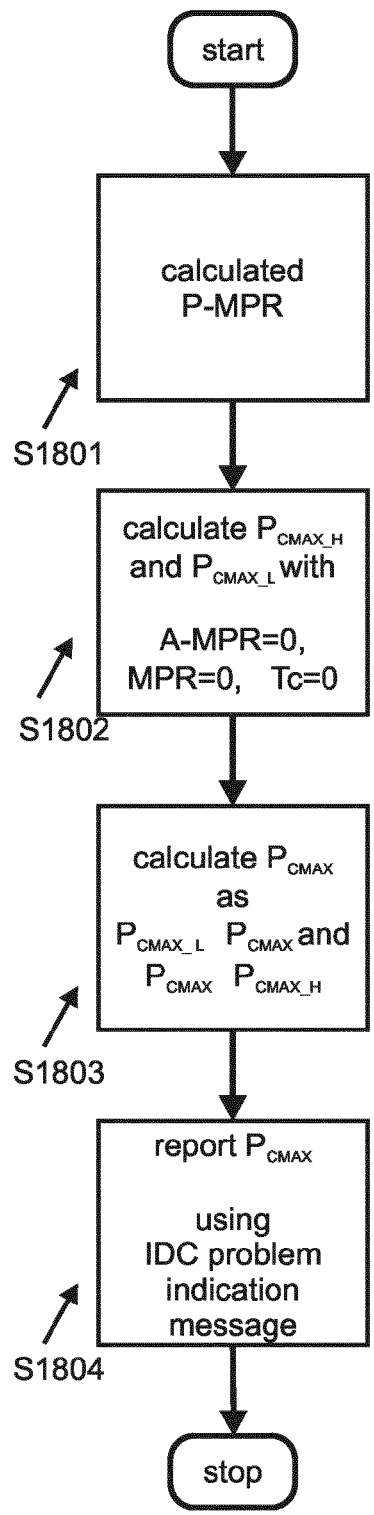
FIG. 18 shows a sequence diagram of an improved maximum output power level reporting mechanism of the user equipment according to a second embodiment of the invention.

Referring to FIG. 18, a sequence diagram of an improved maximum output power level reporting mechanism of a mobile terminal according to another embodiment of the invention is shown. In this embodiment it is the main idea to set the MPR, A-MPR and ΔTc to zero dB for the calculation of Pcmax in case of reporting using an in-device coexistence problem indication message, as will be exemplified in more detail in the following.

As shown in step S1801, also in this case a power management procedure is carried out by a mobile terminal that includes calculation of a power management related power backoff value (P-MPR). The power management procedure may be triggered due to the mobile terminal autonomously reducing its maximum transmission power to minimize/avoid in-device coexistence interference between an E-UTRAN transmitter and a ISM/GNSS receiver.

Having calculated the power management related power backoff value (P-MPR), the mobile terminal proceeds in step S1803a with calculating upper and lower bounds of a maximum output power level.

Also in this embodiment, it is the particular approach for the mobile terminal to disregard other power reduction values when calculating upper and lower bounds to the maximum output power level in step S1803a, namely the maximum power reduction value (MPR) and the additional maximum power reduction value (A-MPR) and the allowed operating band edge transmission power relaxation value ($\Delta T_c$).

In this respect, when setting MPR, A-MPR and ΔTc to zero dB the formulae simplify to:

$$P_{CMAX\_L,C} = \text{MIN}\{P_{EMAX}, P_{PowerClass} - \text{P-MPR}\}$$

$$P_{CMAX\_H,C} = \text{MIN}\{P_{EMAX}, P_{PowerClass}\}$$

Consequently, a mobile terminal calculating the upper and lower bounds to the maximum output power level with MPR=0 dB, A-MPR=0 dB and $\Delta T_c$=0 dB ensures that the bounds will only reflect the power management related power backoff value (P-MPR), namely in calculating the lower bound ($P_{CMAX\_L}$).

Having calculated the upper and lower bounds to the maximum output power level with MPR=0 dB, A-MPR=0 dB and $\Delta T_c$=0 dB, the mobile terminal sets, in step 1803, a maximum output power level ($P_{CMAX}$) within the determined bounds, namely such that it meets the condition $P_{CMAX\_L} \leq P_{CMAX} \leq P_{CMAX\_H}$. The setting of a maximum output level ($P_{CMAX}$) by the mobile terminal is implementation specific and may reflect additional values of concern to the manufacturers of the mobile terminal.

Nevertheless, it can be readily appreciated that the maximum output power level ($P_{CMAX}$) predominantly accords with the bounds determined based on the calculated power management related power backoff value (P-MPR) and not the other power reduction values: MPR, A-MPR or ΔTc. In other words, maximum output power level ($P_{CMAX}$) is only accounting for the power management related power reduction.

Consequently, when reporting by the mobile terminal, in step S1804, the set maximum output power level ($P_{CMAX}$) using in-device coexistence problem indication message, the base station is provided with information on the power management related power backoff value (P-MPR).

In other words, a base station can derive from a received $P_{CMAX}$ value information on the P-MPR value used by the mobile terminal since for setting the $P_{CMAX}$ value, the P-MPR is the only type of power reduction considered by the mobile terminal.

In summary, by the mobile terminal setting MPR, A-MPR and ΔTc to zero dB for the Pcmax information included in the in-device coexistence problem indication message, it is ensured that base station is provided with information on the used P-MPR value and may use this information for a proper uplink scheduling. Accordingly, it is also the approach of the second embodiment to set MPR, A-MPR, ΔTc to zero dB for the calculation of $P_{cmax}$, such that $P_{cmax}$ accounts only for power reductions due to P-MPR.

According to another variation of the second embodiment, the mobile terminal is configured to calculate the "conventional" power management related backoff value (P-MPR) and an "additional" IDC related power backoff value (P-MPR$_{IDC}$). This variation ensures that only power reductions for in-device coexistence interference avoidance is accounted for in the $P_{CMAX}$ calculation.

Specifically, the mobile terminal performs the same calculations for the upper and lower bounds of a maximum output power level as described with respect to the first embodiment. Accordingly, the mobile terminal also calculates the lower bound $P_{CMAX\_L,C}$ as a basis for setting $P_{cmax}$ follows:

$$P_{CMAX\_L,C} = \text{MIN}\{P_{EMAX} - \Delta T_C, P_{PowerClass} - \text{max}(\text{MPR+A-MPR}, \text{P-MPR}, \text{P-MPR}_{IDC}) - \Delta T_c\}.$$

The mobile terminal will then for the calculation of $P_{cmax}$ to be reported in the IDC problem indication message, calculate the upper and lower bounds for the maximum output power level by setting MPR, A-MPR, ΔTc and P-MPR is set to zero dB. Thereby it's ensured that only power reductions which are done for IDC reasons are accounted for in the $P_{cmax}$ value.

It is apparent from the above discussion with respect to FIG. 18, that, according to a variation to the second embodiment, in case of a reporting of a uplink carrier specific reporting of power management related power backoff values (P-MPR$_c$), all above described processing and calculation steps S1801, S1802, S1803, S1804 can be performed separately for a specific uplink carrier.

In this respect, the mobile terminal (UE) may include information of the maximum uplink transmission power (Pcmax) which is tolerable for ISM/GNSS for each configured frequency. To be more specific on the term "for each configured frequency", the mobile terminal (UE) may include power control information for the corresponding uplink carrier/frequency of each configured measurement object (mobility measurements), e.g. uplink-downlink linkage is given by SIB2 linkage.

Accordingly, the base station (eNB) may receive $P_{cmax}$ information not only for the activated cells/carriers, but also for deactivated cell/carriers, such that it may receive $P_{cmax}$ information for all carriers which the base station (eNB) has configured for connected mode mobility measurements.

Similar to an IDC problem indication message conveying FDM assistance information as a list of frequencies (from the configured frequencies) which are unusable due to IDC interference, the mobile terminal (UE) may include in the IDC problem indication message the power control related information for all configured frequencies (IE measObject-EUTRA). Thereby, the mobile terminal (UE) may provide the base station (eNB) with a better picture on the frequency bandwidth utilization at the mobile terminal's side and may enable the base station (eNB) to make a more thouroughful decision when applying a FDM solution for resolving an in-device coexistence interference situation, i.e. the base station (eNB) has more information for decision to which frequency to move the LTE UL.

Advantageously, the improved maximum output power level reporting procedure of the second embodiment allows reporting of $P_{CMAX}$ not only for activated but also for deactivated serving cells using the in-device coexistence problem indication message. As the extended PHR reporting is restricted to activated component carries, the improved maximum output level reporting procedure of the first embodiment would only allow the mobile terminal (UE) to report power headroom information for activated serving cells. Consequently, in the second embodiment the P-MPR power reduction information can not only be provided by the mobile terminal to the base station for activated serving cells but also for deactivated serving cells.

Beneficially, when reporting the power control related information in the IDC problem indication message, according to the second embodiment, all IDC related signaling is conveyed between mobile terminal (UE) and base station (eNB) on one layer such that an implementation complexity at the eNB side can be simplified.

Figure 19:
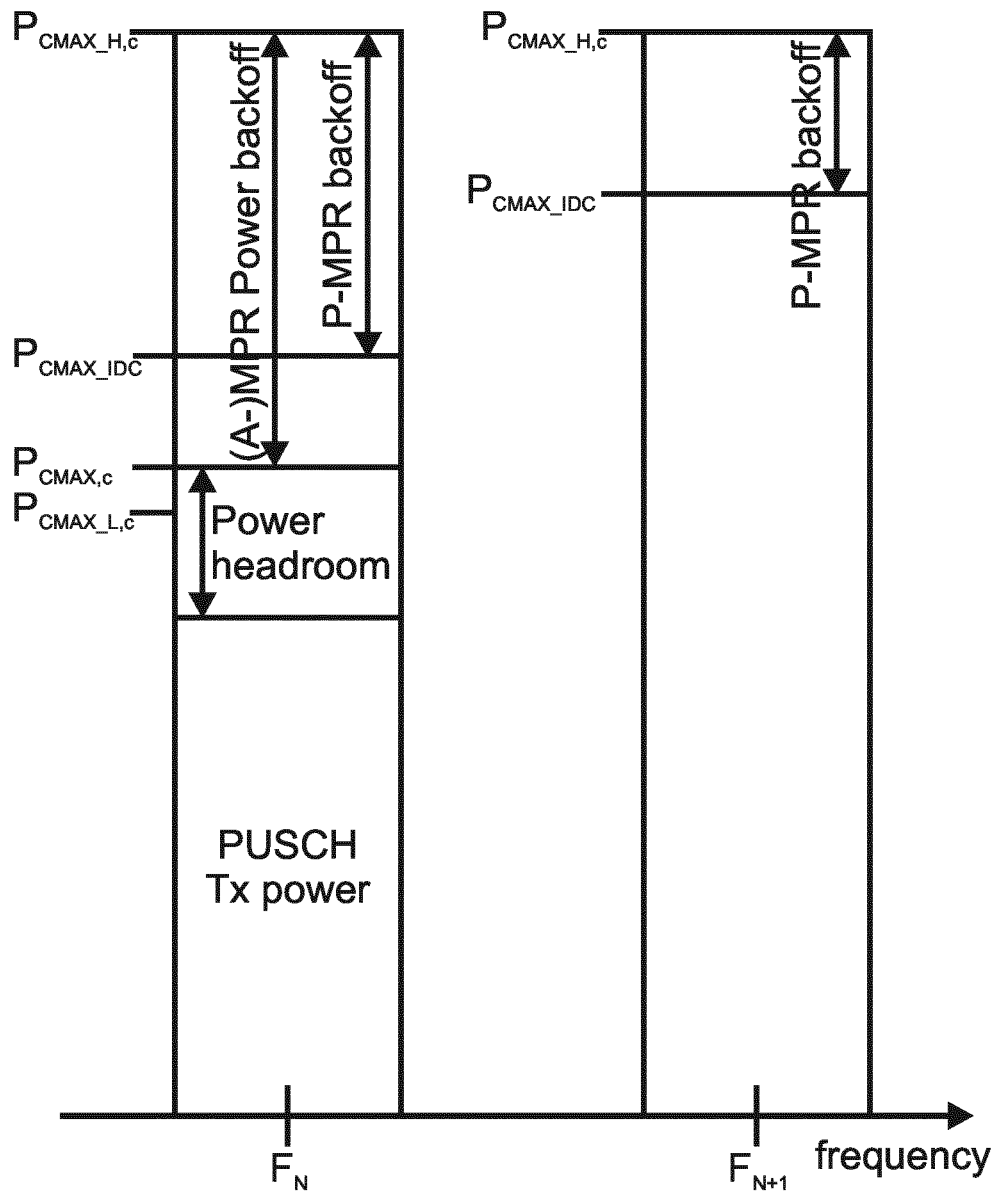
FIG. 19 illustrates an implementation of the improved maximum output power level reporting mechanism according to the second embodiment of the invention.

The above described advantage is illustrated in FIG. 19. Specifically, in FIG. 19 an example is shown where the mobile terminal (UE) includes $P_{CMAX}$ information, i.e. in the figure referred to as $P_{cmax\_IDC}$, in the IDC problem indication message for two uplink frequencies, $F_N$ and $F_{N+1}$, those two frequencies are configured for the mobile terminal. $F_N$ is an activated serving cell/component carrier, whereas $F_{N+1}$ is a deactivated serving cell/component carrier.

According to another embodiment, the mobile terminal according to the invention, upon having determined a maximum output power level ($P_{CMAX}$), as is the case in step S1704a of FIG. 17 or in step 1803 of FIG. 18, is reporting a power reduction value instead of the maximum output power level $P_{CMAX}$ within the IDC problem indication message. Specifically, the power reduction value is a relative value indicating a change in the power reduction with respect to the previous power reduction value and not an absolute value as the maximum output power level $P_{CMAX}$ indicating the respective value in dB.

As a variation of the other embodiment above, the reporting is only done if the power reduction value is non-zero in order to reduce signaling overhead.

Additionally, the base station (eNB) can, according to the second embodiment, be provided with a reason (i.e. supplemental information in form of a flag, a code-word etc.) why the mobile terminal (UE) uses a P-MPR backoff. Among others, the mobile terminal may include in the in-device coexistence problem indication message an indication to the compliance with SAR requirements or to the avoidance of IDC coexistence interference. Beneficially, the scheduling strategy/behaviour of the uplink transmissions of the mobile terminal by the base station may be adjusted depending on whether the mobile terminal (UE) reduces maximum transmit power due to SAR requirements or whether the reduced maximum transmit power results from in-device interference between LTE and ISM/GNSS.

According to a further variation of the second embodiment, the pre-specified formulae used for calculating the upper and lower bounds to the maximum output power level ($P_{cmax}$) requires calculating $P_{PowerClass}$–P-MPR, namely for calculating the lower bound ($P_{CMAX\_L}$). Thereafter, the mobile terminal (UE) would evaluate a minimum between $P_{PowerClass}$–P-MPR and Pemax. The mobile terminal sets, according to this variation of the second embodiment, the value Pemax to zero.

In general, it should be noted that P-MPR (this applies to all embodiments) denotes the power reduction actually used by the mobile, not the maximum power management related power reduction UE is allowed to use.

Furthermore, the P-MPR power reduction value used according to one of the embodiments of the present invention should be some average value. Since the power management related power backoff value (P-MPR) may be used for avoiding interference between LTE UL and ISM/GNSS, this power management related power backoff value (P-MPR) depends also on the uplink resource allocation (number of PRBs and location of PRBs) in LTE and hence could potentially vary on a subframe basis.

In order to avoid such variations of the power backoff value (P-MPR) on a subframe basis, the mobile terminal may assume, according to another variation of the first and second embodiment, a reference uplink allocation (resource block allocation and power spectrum density) when calculating the $P_{cmax}$ value. Exemplary for the reference LTE uplink allocation the allocation pattern fixed in the specifications may be used. Fixing the reference LTE uplink allocation for the calculation of the $P_{cmax}$ value ensures that the $P_{cmax}$ value represents the maximum UL transmission power of the carrier which is tolerable from ISM interference point of view and also is comparable between all carriers.

As mentioned above, in the IDC scenario, the level of interference to ISM/GNSS depends also on the position of allocated RBs and the corresponding power spectrum density. The maximum tolerable UL LTE Tx power for a certain frequency is a value which is derived in the mobile terminal (UE) from various input parameters like the filter characteristics, or the tolerable RX noise increase on the ISM/GNSS band. In practice, the amount of in-device interference is mainly determined by a so-called receiver blocking factor and an intermodulation distortion coefficient (IMD). Receiver blocking occurs when a strong signal close to that being received reduces the sensitivity of the receiver. The presence of intermodulation products gives rise to unwanted signals which may mask the wanted signal thereby impacting the reception quality.

According to another variation of the second embodiments of the invention, the mobile terminal is reporting a position of a PRB region within the configured LTE band where an allocation of physical resource blocks (PRB) for UL transmissions leads to acceptable ISM/GNSS interference. Specifically, the mobile terminal subdivides a configured UL serving cell into separate PRB regions and determines a respective power management related power backoff value for each of the PRB regions. Then, the mobile terminal can provide the base station with assistance to avoid in-device coexistence interference by reporting a maximum output power level ($P_{CMAX}$) including a position of the respective PRB region.

Exemplary, the mobile terminal (UE) is configured with one UL serving cell of 20 Mhz in band 7 residing from 2500 Mhz to 2520 Mhz. In this example the mobile terminal (UE) reports within the IDC problem indication message that allocating UL resources in the upper part of the serving cell's band, e.g. from 2510 Mhz to 2520 Mhz, is tolerable (i.e. has a specific maximum output power level $P_{CMAX}$) from reception quality point of view in the ISM band. When receiving this information, the base station (eNB) will schedule future uplink transmissions only within the indicated PRB region corresponding to a frequency range and thereby avoiding in-device interference. Alternatively, the mobile terminal (UE) indicates the PRB starting position within the LTE bandwidth and the number of PRBs for which reception quality at the ISM band is sufficiently good.

According to another variation the mobile terminal (UE) reports the required power reduction for certain PRB regions within the LTE bandwidth of the carriers. Assuming the above described exemplary scenario, the mobile terminal (UE) would indicate a power reduction value of 0 dB for PRB region 2510 Mhz to 2520 Mhz and for example a required power reduction value (P-MPR) of 3 dB for the PRB region from 2500 Mhz-2510 Mhz.

As already mentioned, it is an aspect of the invention to solve IDC problems by means of the improved maximum output power level reporting mechanism, setting aside the TDM/FDM solution discussed in the technical background section. In other words, a power control solution is considered, where LTE interference to a different radio is mitigated by lowering the maximum transmission power for LTE uplink. It should be noted that the power control solution would be basically autonomously performed by the UE, whereas the TDM/FDM solution is purely network-controlled.

Furthermore, since there are currently no test requirements for P-MPR usage and also no P-MPR values are given in RAN4 specifications, the calculation of the P-MPR value is more or less UE implementation specific. Therefore, some network vendors respectively operators may refrain from allowing UEs to autonomously reduce their maximum transmission power. One argument in support of preventing from autonomous maximum power control may be that according to the operator's policy, only a TDM or FDM solution allows for the control by the eNB in order to solve IDC problems.

Therefore according to another implementation of the second embodiment, the network respectively base station (eNB) explicitly controls/enables power reduction (P-MPR usage) for IDC reasons. This may be realized by the base station (eNB) signaling whether or not a mobile terminal (UE) is allowed to use P-MPR power reduction for IDC reasons.

Examples of such a signaling include an on/off signaling (enabling/disabling this functionality in the UE) and a signaling of a maximum P-MPR respectively power reduction value the mobile terminal (UE) may use. The later described maximum P-MPR respectively power reduction value may either be specified on a per carrier frequency basis or on a per mobile terminal (UE) basis.

Figure 20:
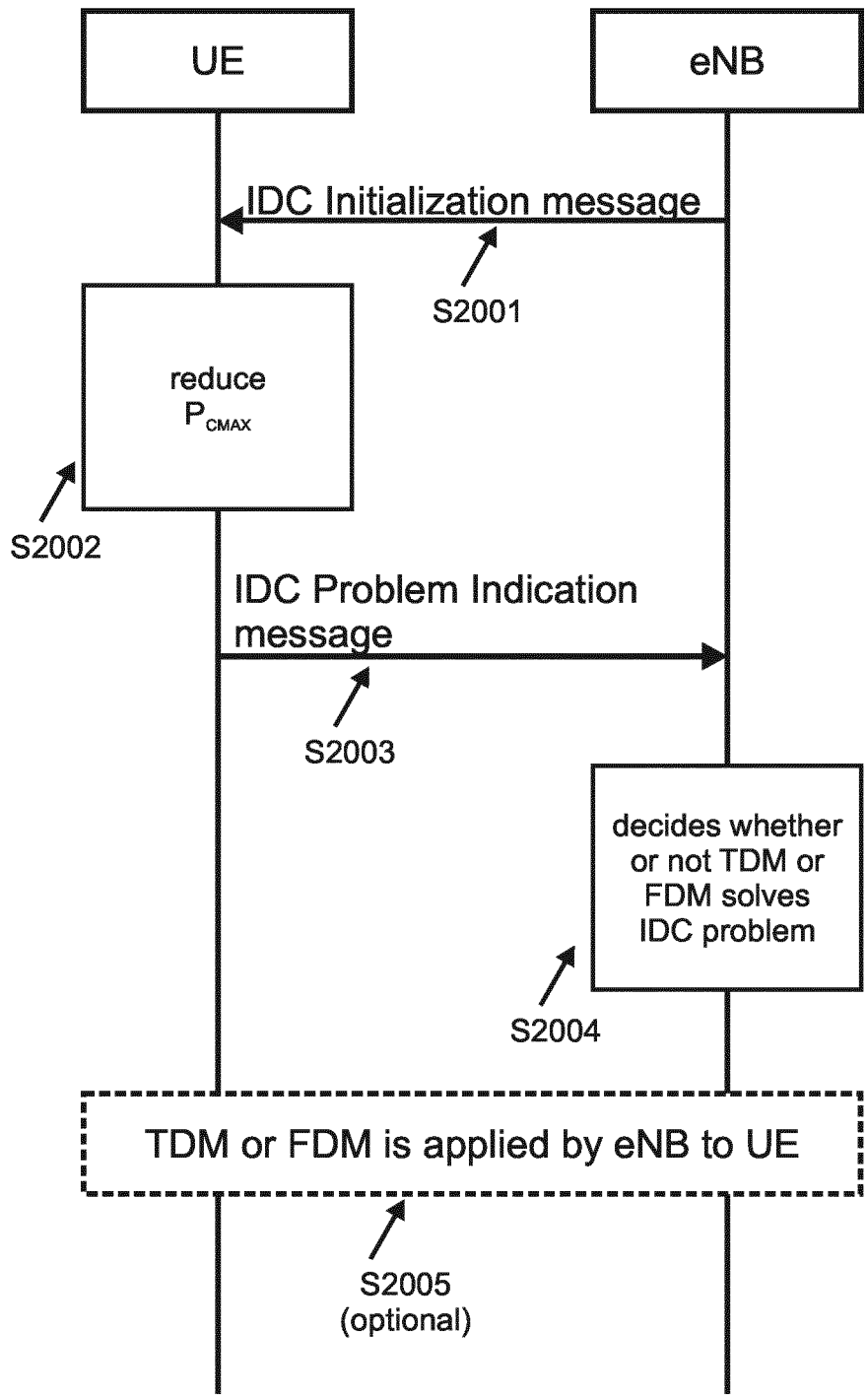
FIG. 20 illustrates another implementation of the improved maximum output power level reporting mechanism between the user equipment and the base station according to the second embodiment of the invention.

Referring now to FIG. 20, another implementation of the improved maximum output power level interference reporting mechanism between the user equipment and the base station according to the second embodiment of the invention is shown. According to this other implementation, the information whether the mobile terminal (UE) is allowed to reduce the maximum Tx power autonomously is included in the dedicated message (termed IDC initialization message in step S2001) which is sent by network to indicate whether the mobile terminal (UE) may trigger and send an "IDC problem indication" message.

Based on the information signaled in the "IDC initialization message", the mobile terminal (UE) considers P-MPR for IDC or not. An exemplary mobile terminal (UE) behavior may be that in case mobile terminal (UE) is allowed to use P-MPR, mobile terminal (UE) will first try to reduce UL Tx power, as indicated in step S2002, before sending IDC Problem Indication message in step S2003. Furthermore, the mobile terminal (UE) will only include power control related information (Pcmax_IDC) in "IDC Problem Indication" message, when UE is allowed to use P-MPR for IDC reasons.

According to another variation of this specific implementation, the mobile terminal (UE) indicates to base station (eNB) whether it assumes to apply a power reduction, e.g. by P-MPR value, when suggesting a TDM pattern.

For example it might be the case that the mobile terminal (UE) suggests a longer LTE On-Duration time to eNB because it considers in addition to reduce its maximum transmission power and thereby avoiding too strong interference to the other radio (ISM/GNSS), i.e. combination of TDM and power control solution, compared to the case where mobile terminal (UE) would not apply a power reduction.

Hardware and Software Implementation of the Invention

Another embodiment of the invention relates to the implementation of the above described various embodiments using hardware and software. In this connection the invention provides a user equipment (mobile terminal) and a eNodeB (base station). The user equipment is adapted to perform the methods described herein.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A mobile terminal for reporting a maximum output power level ($P_{CMAX}$) in a mobile communication system including a base station and a wireless communication device, the mobile terminal having a predetermined nominal mobile terminal power ($P_{PowerClass}$) and being configured with a maximum allowed mobile terminal output power ($P_{EMAX}$) for communication with the base station via one radio technology and being configured for communication with the wireless communication device via another radio technology, the mobile terminal comprising:
   a processor configured to calculate a power management related power backoff value (P-MPR) for the one radio technology by referring to a reception quality level set for communication via the other radio technology;
   wherein the processor is further configured to determine whether or not the calculated power management related power backoff value (P-MPR) for the one radio technology exceeds a predefined power backoff threshold value; and
   wherein the processor is further configured to calculate lower and upper bounds of a maximum output power level ($P_{CMAX\_L}$; $P_{CMAX\_H}$) for the one radio technology based on the calculated power management related power backoff value (P-MPR), where the lower bound ($P_{CMAX\_L}$) and the upper bound ($P_{CMAX\_H}$) are defined by:

$$P_{CMAX\_L} = \min\{P_{EMAX} - \Delta T_c, P_{PowerClass} - \max(\text{MPR} + \text{A-MPR}, \text{P-MPR}) - \Delta T_c\}$$

$$P_{CMAX\_H} = \min\{P_{EMAX}, P_{PowerClass}\}$$

wherein the processor is further configured to set the maximum output power level ($P_{CMAX}$) for communication on the one radio technology, where the maximum output power level ($P_{CMAX}$) is set within the determined lower and upper bounds to meets the condition: $P_{CMAX\_L} \leq P_{CMAX} \leq P_{CMAX\_H}$;

a transmitter configured to report the set maximum output power level ($P_{CMAX}$) using an extended power headroom report (ePHR) for the one radio technology to the base station; and wherein in case the calculated power management related power backoff value (P-MPR) exceeds the predefined power backoff threshold value, the lower bound ($P_{CMAX\_L}$) is calculated using MPR=0 dB, A-MPR=0 dB, and either an allowed operating band edge transmission power relaxation value ($\Delta T_c$) or $\Delta T_c$=0 dB; and in case the calculated power management related power backoff value (P-MPR) does not exceed the predefined power backoff threshold value, the lower and upper bounds ($P_{CMAX\_L}$;$P_{CMAX\_H}$) are calculated using a mobile terminal specific allowed maximum power reduction value (MPR), a mobile terminal specific additional maximum power reduction value (A-MPR), and an allowed operating band edge transmission power relaxation value ($\Delta T_c$).

2. The mobile terminal according to claim 1, wherein the transmitter is further configured to report for the one radio technology the set maximum output power level ($P_{CMAX}$) to the base station using the extended power headroom report (ePHR) including a P-bit, wherein:

in case the calculated power management related power backoff value (P-MPR) exceeds the predefined power backoff threshold value, the P-bit is set to 1, and in case the calculated power management related power backoff value (P-MPR) does not exceed the predefined power backoff threshold value, the P-bit is set to 1 if MPR+A-MPR≤P-MPR and the P-bit is set to 0 if MPR+A-MPR>P-MPR.

3. The mobile terminal according to claim 1, wherein the transmitter is further configured to report the set maximum output power level ($P_{CMAX}$) using the extended power headroom report (ePHR) employing a medium access control, MAC, element to the base station.

4. The mobile terminal according to claim 1, wherein the processor is further configured:

to calculate the power management related power backoff value (P-MPR) for the one radio technology such that the maximum output power level for the one and the other radio technology meets Specific Absorption Rate (SAR) requirements for the mobile terminal, or to calculate the power management related power backoff value (P-MPR) for the one radio technology so as to avoid in-device interference between the one and the other radio technology.

5. The mobile terminal according to claim 1, wherein:

the processor is further configured to calculate the power management related power backoff value (P-MPR) for the one radio technology such that the maximum output power level for the one and the other radio technology meets Specific Absorption Rate (SAR) requirements for the mobile terminal, and to calculate an additional power management related power backoff value (P-MPR$_{IDC}$) for the one radio technology so as to avoid in-device interference between the one and the other radio technology; and wherein the processor is further configured to calculate lower and upper bounds of a maximum output power level ($P_{CMAX\_L}$;$P_{CMAX\_H}$) for the one radio technology based on the two calculated power management related power backoff values (P-MPR,P-MPR$_{IDC}$), where the lower bound ($P_{CMAX\_L}$) and the upper bound ($P_{CMAX\_H}$) are defined by:

$$P_{CMAX\_L} = \min\{P_{EMAX} - \Delta T_c, P_{PowerClass} - \max(\text{MPR} + \text{A-MPR}, \text{P-MPR}, \text{P-MPR}_{IDC}) - \Delta T_c\}$$

$$P_{CMAX\_H} = \min\{P_{EMAX}, P_{PowerClass}\}$$

wherein the lower bound ($P_{CMAX\_L}$) is calculated using MPR=0 dB, A-MPR=0 dB, P-MPR=0 dB and either an allowed operating band edge transmission power relaxation value ($\Delta T_c$) or $\Delta T_c$=0 dB.

6. A mobile terminal for reporting a maximum output power level ($P_{CMAX}$) in a mobile communication system including a base station and a wireless communication device, the mobile terminal having a predetermined nominal mobile terminal power ($P_{PowerClass}$) and being configured with a maximum allowed mobile terminal output power ($P_{EMAX}$) for communication with the base station via one radio technology and being configured for communication with the wireless communication device via another radio technology, the mobile terminal comprises:

a processor configured to calculate a power management related power backoff value (P-MPR) for the one radio technology so as to avoid in-device interference between the one and the other radio technology, by referring to a reception quality level set for communication via the other radio technology;

wherein the processor is further configured to calculate lower and upper bounds of a maximum output power level ($P_{CMAX\_L}$;$P_{CMAX\_H}$) for the one radio technology based on the calculated power management related power backoff value (P-MPR), where the lower bound ($P_{CMAX\_L}$) and the upper bound ($P_{CMAX\_H}$) are defined by:

$$P_{CMAX\_L} = \min\{P_{EMAX} - \Delta T_c, P_{PowerClass} - \max(\text{MPR} + \text{A-MPR}, \text{P-MPR}) - \Delta T_c\}$$

$$P_{CMAX\_H} = \min\{P_{EMAX}, P_{PowerClass}\}$$

wherein the processor is further configured to set a maximum output power level ($P_{CMAX}$) for communication on the one radio technology, where the configured maximum output power level ($P_{CMAX}$) is set within the determined lower and upper bounds to meets the condition: $P_{CMAX\_L} \leq P_{CMAX} \leq P_{CMAX\_H}$; and a transmitter configured to report the set maximum output power level ($P_{CMAX}$) using an in-device coexistence, IDC, problem indication message for the one radio technology to the base station; wherein the lower bound ($P_{CMAX\_L}$) is calculated using MPR=0 dB, A-MPR=0 dB and either an allowed operating band edge transmission power relaxation value ($\Delta T_c$) or $\Delta T_c$=0 dB.

7. The mobile terminal according to claim 6, wherein the transmitter is further configured to report using the in-device coexistence, IDC, problem indication message employing a radio resource control, RRC, message via an uplink dedicated control channel, UL-DCCH, to the base station.

8. The mobile terminal according to claim 6, wherein the reporting of the set maximum output power level ($P_{CMAX}$) using an in-device coexistence, IDC, problem indication message for the one radio technology to the base station is enabled when a receiver of the mobile terminal receives an in-device coexistence, IDC, initialization message for the one radio technology.

9. The mobile terminal according to claim 8, the processor is further adapted to reduce the set maximum output power level ($P_{CMAX}$) for communication on the one radio technology within the determined lower and upper bounds based on information included in a received in-device coexistence, IDC, initialization message; and wherein, in case the receiver of the mobile terminal receives the in-device coexistence, IDC, initialization message, the processor reduces the set maximum output power level ($P_{CMAX}$) before the transmitter reports the reduced maximum output power level ($P_{CMAX}$) using an in-device coexistence, IDC, problem indication message for the one radio technology to the base station.

10. The mobile terminal according to the claim 1, wherein the processor is adapted to calculate power management related power backoff values (P-MPR$_c$) of a plurality of uplink carriers on cells for which the mobile terminal is configured;

wherein the processor is further adapted to calculate upper and lower bounds of the maximum output power level ($P_{CMAX\_L}$;$P_{CMAX\_H,c}$) for each of the uplink carriers as defined by:

$$P_{CMAX\_L,c}=\min\{P_{EMAX}-\Delta T_c, P_{PowerClass}-\max(MPR+A-MPR,P-MPR_c)-\Delta T_c\}$$

$$P_{CMAX\_H,c}=\min\{P_{EMAX}, P_{PowerClass}\}; \text{ and}$$

wherein the processor is further adapted to set maximum output power levels ($P_{CMAX,c}$) for each of the uplink carriers, where the maximum output power levels ($P_{CMAX,c}$) are set within the respective determined lower and upper bounds to meets the condition: $P_{CMAX\_L,c} \leq P_{CMAX,c} \leq P_{CMAX\_H,c}$; and wherein the transmitter is further adapted to report the set maximum output power levels ($P_{CMAX,c}$) for each of the uplink carriers to the base station.

11. The mobile terminal according to claim 10, wherein the plurality of uplink carriers correspond to frequencies for which a respective measurement object is configured.

12. The mobile terminal according to claim 1, wherein the processor is adapted to calculate a power management related power backoff value (P-MPR) or plural power management related power backoff values (P-MPR$_c$) for the one radio technology by referring to a reception quality level set for communication via the other radio technology based on a reference uplink allocation for the one radio technology.

13. A method for reporting a maximum output power level ($P_{CMAX}$) by a mobile terminal in a mobile communication system including a base station and a wireless communication device, the mobile terminal having a predetermined nominal mobile terminal power ($P_{PowerClass}$) and being configured with a maximum allowed mobile terminal output power ($P_{EMAX}$) for communication with the base station via one radio technology and being configured for communication with the wireless communication device via another radio technology, the method comprising the steps of:

calculating, by the mobile terminal, a power management related power backoff value (P-MPR) for the one radio technology by referring to a reception quality level set for communication via the other radio technology;

determining, by the mobile terminal, whether or not the calculated power management related power backoff value (P-MPR) for the one radio technology exceeds a predefined power backoff threshold value; and calculating, by the mobile terminal, lower and upper bounds of a maximum output power level ($P_{CMAX\_L}$; $P_{CMAX\_H}$) for the one radio technology based on the calculated power management related power backoff value (P-MPR), where the lower bound ($P_{CMAX\_L}$) and the upper bound ($P_{CMAX\_H}$) are defined by:

$$P_{CMAX\_L}=\min\{P_{EMAX}-\Delta T_c, P_{PowerClass}-\max(MPR+A-MPR,P-MPR)-\Delta T_c\}$$

$$P_{CMAX\_H}=\min\{P_{EMAX}, P_{PowerClass}\}$$

setting, by the mobile terminal, the maximum output power level ($P_{CMAX}$) for communication on the one radio technology, where the maximum output power level ($P_{CMAX}$) is set within the determined lower and upper bounds to meets the condition: $P_{CMAX\_L} \leq P_{CMAX} \leq P_{CMAX\_H}$;

reporting, by the mobile terminal, the set maximum output power level ($P_{CMAX}$) using an extended power headroom report (ePHR) for the one radio technology to the base station; and wherein in case the calculated power management related power backoff value (P-MPR) exceeds the predefined power backoff threshold value, the lower bound ($P_{CMAX\_L}$) is calculated using MPR=0 dB, A-MPR=0 dB, and either an allowed operating band edge transmission power relaxation value ($\Delta T_c$) or $\Delta T_c$=0 dB ; and in case the calculated power management related power backoff value (P-MPR) does not exceed the predefined power backoff threshold value, the lower and upper bounds ($P_{CMAX\_L}$;$P_{CMAX\_H}$) are calculated using a mobile terminal specific allowed maximum power reduction value (MPR), a mobile terminal specific additional maximum power reduction value (A-MPR), and an allowed operating band edge transmission power relaxation value ($\Delta T_c$).

14. The method according to claim 13, wherein the step of reporting, by the mobile terminal, the set maximum output power level ($P_{CMAX}$) using an extended power headroom report (ePHR) for the one radio technology to the base station, includes setting a P-bit included in the extended power headroom report (ePHR), wherein:

in case the calculated power management related power backoff value (P-MPR) exceeds the predefined power backoff threshold value, the P-bit is set to 1, and in case the calculated power management related power backoff value (P-MPR) does not exceed the predefined power backoff threshold value, the P-bit is set to 1 if MPR+A-MPR≤P-MPR and the P-bit is set to 0 if MPR+A-MPR>P-MPR.

15. The method according to claim 13, wherein the step of reporting, by the mobile terminal, the set maximum output power level ($P_{CMAX}$) using an extended power headroom report (ePHR) includes transmitting a medium access control, MAC, element to the base station.

16. The method according to claim 13, wherein:
the step of calculating the power management related power backoff value (P-MPR) by the mobile terminal, includes:
calculating the power management related power backoff value (P-MPR) for the one radio technology such that the maximum output power level for the one and the other radio technology meets Specific Absorption Rate (SAR) requirements for the mobile terminal, or
calculating the power management related power backoff value (P-MPR) for the one radio technology so as to avoid in-device interference between the one and the other radio technology.

17. The method according to claim 13, wherein:
the step of calculating the power management related power backoff value (P-MPR) by the mobile terminal includes: calculating the power management related power backoff value (P-MPR) for the one radio technology such that the maximum output power level for the one and the other radio technology meets Specific Absorption Rate (SAR) requirements for the mobile terminal, and calculating an additional power management related power backoff value (P-MPR$_{IDC}$) for the one radio technology so as to avoid in-device interference between the one and the other radio technology; and wherein the step of calculating, by the mobile terminal, lower and upper bounds (P$_{CMAX\_L}$;P$_{CMAX\_H}$) includes: calculating lower and upper bounds of a maximum output power level (P$_{CMAX\_L}$;P$_{CMAX\_H}$) for the one radio technology based on the two calculated power management related power backoff values (P-MPR,P-MPR$_{IDC}$) where the lower bound (P$_{CMAX\_L}$) and the upper bound (P$_{CMAX\_H}$) are defined by:

$$P_{CMAX\_L}=\min\{P_{EMAX}-\Delta T_c, P_{PowerClass}-\max(MPR+A\text{-}MPR,P\text{-}MPR,P\text{-}MPR_{IDC})-\Delta T_c\}$$

$$P_{CMAX\_H}=\min\{P_{EMAX},P_{PowerClass}\}$$

wherein the lower bound (P$_{CMAX\_L}$) is calculated using MPR=0 dB, A-MPR=0 dB, P-MPR=0 dB and either an allowed operating band edge transmission power relaxation value ($\Delta T_c$) or $\Delta T_c$=0 dB.

18. The method according to claim 13, wherein
the step of calculating, by the mobile terminal, the power management related power backoff value (P-MPR) for the one radio technology includes: calculating power management related power backoff values (P-MPR$_c$) of a plurality of uplink carriers on cells for which the mobile terminal is configured;

wherein the step of calculating, by the mobile terminal, lower and upper bounds of the maximum output power level (P$_{CMAX\_L}$;P$_{CMAX\_H}$) includes: calculating upper and lower bounds of the maximum output power level (P$_{CMAX\_L,c}$;P$_{CMAX\_H,c}$) for each of the uplink carriers as defined by:

$$P_{CMAX\_L,c}=\min\{P_{EMAX}-\Delta T_c, P_{PowerClass}-\max(MPR+A\text{-}MPR,P\text{-}MPR_c)-\Delta T_c\}$$

$$P_{CMAX\_H,c}=\min\{P_{EMAX},P_{PowerClass}\}; \text{ and}$$

wherein the step of setting, by the mobile terminal, the maximum output power level (P$_{CMAX}$) for communication on the one radio technology includes: setting maximum output power levels (P$_{CMAX,c}$) for each of the uplink carriers, where the maximum output power levels (P$_{CMAX,c}$) are set within the respective determined lower and upper bounds to meets the condition: P$_{CMAX\_L,c}$≤P$_{CMAX,c}$≤P$_{CMAX\_H,c}$; and wherein the step of reporting, by the mobile terminal, the set maximum output power level (P$_{CMAX}$), includes reporting the set maximum output power levels (P$_{CMAX,c}$) for each of the uplink carriers to the base station.

19. The method according to claim 13, wherein the step of calculating, by the mobile terminal, a power management related power backoff value (P-MPR) or plural power management related power backoff values (P-MPR$_C$) for the one radio technology by referring to a reception quality level set for communication via the other radio technology is based on a reference uplink allocation for the one radio technology.

* * * * *